(12) United States Patent
Norita et al.

(10) Patent No.: US 6,906,751 B1
(45) Date of Patent: Jun. 14, 2005

(54) DIGITAL CAMERA AND CONTROL METHOD THEREOF

(75) Inventors: Toshio Norita, Osaka (JP); Kazuchika Sato, Kobe (JP); Makoto Miyazaki, Ibaraki (JP); Koichi Kamon, Takatsuki (JP); Hiroyuki Okada, Izumi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/356,564

(22) Filed: Jul. 19, 1999

(30) Foreign Application Priority Data

Jul. 22, 1998 (JP) .......................... P10-206493
Mar. 25, 1999 (JP) .......................... P11-081566

(51) Int. Cl.⁷ .......................... H04N 9/64; H04N 5/222; H04N 3/335; G02B 27/40
(52) U.S. Cl. .................. 348/349; 348/333.01; 348/294; 250/201
(58) Field of Search ........................... 348/294, 333.01, 348/308, 345, 349, 350, 353, 302; 250/201

(56) References Cited

U.S. PATENT DOCUMENTS

| | | | | |
|---|---|---|---|---|
| 5,031,049 A | * | 7/1991 | Toyama et al. | 348/352 |
| 5,363,137 A | * | 11/1994 | Suga et al. | 348/302 |
| 5,422,671 A | * | 6/1995 | Yamada et al. | 348/345 |
| 5,541,654 A | * | 7/1996 | Roberts | 348/302 |
| 5,619,264 A | * | 4/1997 | Yoshimura et al. | 348/352 |
| 5,668,597 A | * | 9/1997 | Parulski et al. | 348/353 |
| 6,088,060 A | * | 7/2000 | Suda et al. | 348/350 |
| 6,094,223 A | * | 7/2000 | Kobayashi | 348/349 |
| 6,124,888 A | * | 9/2000 | Terada et al. | 348/308 |
| 6,452,632 B1 | * | 9/2002 | Umeda et al. | 348/294 |

FOREIGN PATENT DOCUMENTS

| | | | | |
|---|---|---|---|---|
| JP | 01117576 A | | 5/1989 | |
| JP | 04-313949 A | * | 11/1992 | H04N/1/04 |
| JP | 8-31994 | | 3/1996 | |

* cited by examiner

Primary Examiner—Thai Tran
Assistant Examiner—Nhan Tran
(74) Attorney, Agent, or Firm—Burns, Doane, Swecker & Mathis, L.L.P.

(57) ABSTRACT

A solid-state image sensor includes a photocell array for accumulating signal charge for each pixel in accordance with progress of exposure, and a read circuit for reading out information on the accumulated signal charge from the photocell array. With an insulating structure between its input and output, an amplifier in the read circuit generates an output signal without resetting the accumulated charge in the photocell. Information on the accumulated charge is read out at different exposure times while signal charge is accumulated during exposure, and a plurality of image signals can sequentially be obtained without destroying the information.

6 Claims, 24 Drawing Sheets

☐ PIXELS NOT TO BE READ

▨ PIXELS USED FOR DISPLAY

DIGITAL CAMERA AND CONTROL METHOD THEREOF

This application is based on application Nos. 10-206493 and 11-81566 filed in Japan, the contents of which are hereby incorporated by reference.

BACKGROUND OF THE INVENTION

1. Field of the Invention

The present invention relates to readout control of image signals obtained in an image sensor of a digital camera.

2. Description of the Background Art

On typical digital cameras, a solid-state image sensor such as a CCD (Charge Coupled Device) stores a subject image as signal charge and converts the charge into an electric image signal. Through signal processing such as amplification, the electric signal is displayed on a display such as CRT or stored as an image file. For such digital cameras, one of the factors determining the brightness of an output image is the exposure time. A short exposure time darkens the overall output image, whereas an excessively long exposure time causes accumulated signal charge in the solid-state image sensor to reach a level of saturation beyond a storage capacity, thereby making it difficult to identify the output image.

Japanese Patent Laid-open No. 8-31994 for example discloses a conventional technique for adjusting the exposure time. This technique is to control the time to accumulate signal charge automatically in accordance with varying illumination of a subject to thereby adjust an output image at a predetermined level.

Such automatic control of the conventional technique, however, prevents a user from capturing an image at desired exposure. This is the first problem of conventional digital cameras.

The second problem is caused from the intrinsic character of CCD cells. In the use of the CCD, pixel data are read out in sequence according to a pixel array of the CCD. In this case, a selective readout of only specific pixel data is impossible.

On the other hand, most of digital cameras perform preliminary imaging for automatic exposure (AE) and automatic focusing (AF) prior to actual imaging for recording or for display of a subject image on a liquid crystal display (LCD). Even in such preliminary imaging, pixel data are read out from all pixels because of the use of the CCD. On display, however, only pixel data left after data skipping are displayed since the LCD provided in a digital camera generally has a smaller number of pixels (e.g., about a half) than the CCD array in the image sensor. In addition, it is often unnecessary to use all pixel data in AE and AF operations.

On a conventional digital camera, all pixel data is read out from the image sensor even in the preliminary imaging that requires not all data. Accordingly, a readout of pixel data is time consuming, thereby delaying the actual imaging.

SUMMARY OF THE INVENTION

The present invention is directed to a digital camera.

In an aspect of the present invention, the digital camera comprises: an image sensor including a photocell array for accumulating charge for each pixel in accordance with progress of exposure, and a read circuit for reading-out information on accumulated charge nondestructively from the photocell array; and a read controller for repeatedly activating the read circuit while the photocell array accumulates charge during exposure, to thereby sequentially capture a plurality of image signals corresponding to a plurality of exposure times with respect to a substantially same scene.

Preferably, the digital camera further comprises: a memory capable of storing at least two image signals among the plurality of image signals corresponding to the plurality of exposure times.

In a preferred embodiment of the present invention, the digital camera further comprises: judging means for making a judgement whether the memory has enough free space for a new image signal to be stored; and a memory controller for erasing the oldest one of already-stored image signals from the memory if the memory has not enough space, and storing the new image signal.

In an aspect of the present invention, the digital camera further comprises: a display device capable of displaying an image; and a display controller for receiving the plurality of image signals from the read controller and controlling the display device to display a plurality of images corresponding to the plurality of image signals.

The display controller may control the display device to selectively display the plurality of images in time-sequence in accordance with an order of respective exposure times.

Alternatively, the display controller may control the display device to simultaneously display two or more of the plurality of images.

The digital camera may further comprises: a manual operating member for selecting one of the plurality of images displayed, to determine a selected-image; and a recording controller for storing the selected-image in a recording medium.

In a preferred embodiment of the present invention, the digital camera further comprises: setting means for setting the plurality of exposure times in the read controller.

Preferably, the plurality of exposure times are determined such that a first time period elapsed before capturing a first image signal from start of exposure is longer than a second time period elapsed before capturing a second image signal since the first image signal is captured.

The digital camera may be provided with: a switching operating member for switching between a multiple exposure mode and a single exposure mode, wherein in the multiple exposure mode, the read controller sequentially captures the plurality of image signals corresponding to the plurality of exposure times with respect to a substantially same scene, and in the single exposure mode, the read controller captures a single image signal corresponding to one exposure time with respect to a substantially same scene.

In another aspect of the present invention, a digital camera comprises: an image sensor for converting a subject image into an electric signal on a plurality of pixels to obtain a captured image, the sensor being capable of randomly selecting one or more pixels to be read-out from the plurality of pixels; and a control circuit for reading-out the electric signal from the image sensor in accordance with a pixel pattern, the pixel pattern being different among first and second operations of the digital camera.

The control circuits may include: a pattern selector for selecting a first pixel pattern in the first operation and a second pixel pattern different from the first pixel pattern in the second operation; and a pixel selector for selecting and reading-out a set of pixels from all pixels of the image sensor in accordance with a selected pixel pattern.

Preferably, the image sensor is a MOS image sensor having a matrix structure with rows and columns of pixels each composed of a photodiode and a MOS switch.

The digital camera may further comprises: a plurality of control switches, wherein the first and second operations are performed in response to an operation of at least one of the plurality of control switches.

In a preferred embodiment of the present invention, the first operation is a recording operation to record the captured image in a recording medium in accordance with a first pixel pattern; the second operation is a display operation to display the captured image in accordance with a second pixel pattern; and the second pixel pattern has a smaller number of pixels-to-be-read than the first pixel pattern.

In another preferred embodiment of the present invention, the first operation is a recording operation to record the captured image in a recording medium in accordance with a first pixel pattern; the second operation is an autofocusing operation to obtain focus in accordance with a second pixel pattern in the captured image; and the second pixel pattern has a predetermined area having a higher density of pixels-to-be-read than the other areas of the second pixel pattern.

The predetermined area of the second pixel pattern may be variable according to a position of the subject image in focus.

In further another aspect of the present invention, a digital camera comprises: an image sensor for converting a subject image into an electric signal, the image sensor being capable of randomly selecting pixels-to-be-read; an operating member; a selector for selecting one of a plurality of pixel patterns according to operation of the operating member; and a control circuit for reading-out an image signal from the image sensor according to a selected pixel pattern.

In further another aspect of the present invention, a digital camera comprises: an image sensor for capturing a subject image to obtain electric signals on an array of photocells; and a signal reader operable to read-out the electric signals from the array of photocells at different conditions for a substantially same scene without substantially erasing the electric signals in the array of photocells, whereby different image expressions of the substantially same scene are obtained.

The different conditions may include different time points at which the image signals are read-out from the array of photocells, and the different time points are defined within a time period during which the electric signals are accumulated on the array of photocells for the substantially same scene.

In a preferred embodiment of the present invention, the different conditions include different pixel-patterns at which the image signals are read-out from the array of photocells for the substantially same scene.

The present invention also provides a method of controlling a digital camera comprising an image sensor capable of reading-out information on accumulated charge nondestructively from a photocell array.

The present invention also provides a method of controlling a digital camera comprising an image sensor capable of randomly selecting a pixel to be read.

Accordingly, an object of the present invention is to provide a digital camera that allows a user to select an image with desired exposure.

Another object of the present invention is to provide a digital camera that shortens the time involved in the preliminary imaging to thereby reduce time required before the actual imaging, and to provide a control method of the digital camera.

These and other objects, features, aspects and advantages of the present invention will become more apparent from the following detailed description of the present invention when taken in conjunction with the accompanying drawings.

DESCRIPTION OF THE PREFERRED EMBODIMENTS

A. First Preferred Embodiment

A-1. Hardware Construction of Digital Camera

A hardware construction of an electric digital camera 100 according to a first preferred embodiment of the present invention will be described.

Figure 1:
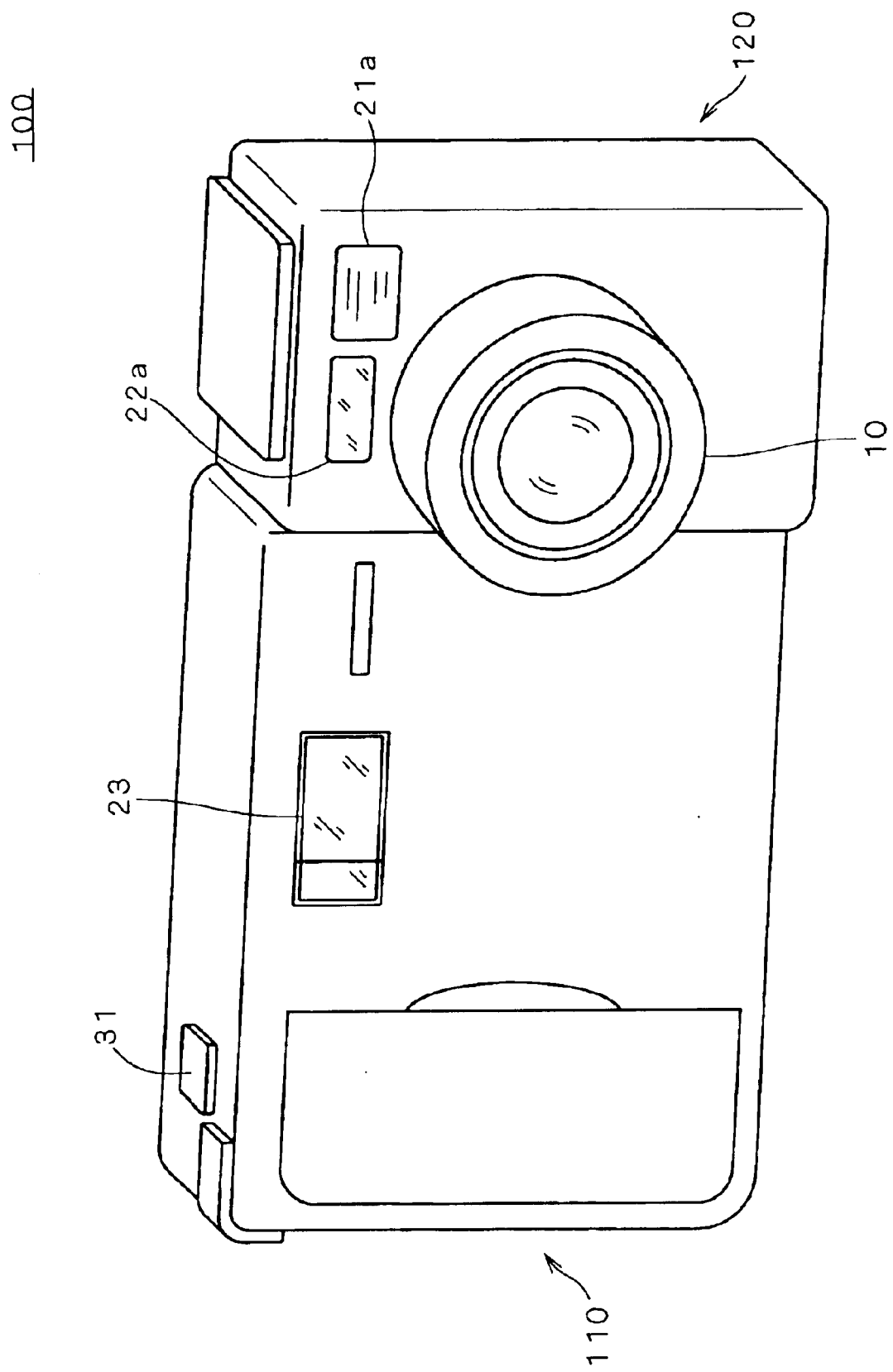
FIG. 1 is an external view of a digital camera 100 according to a first preferred embodiment of the present invention.
Figure 2:
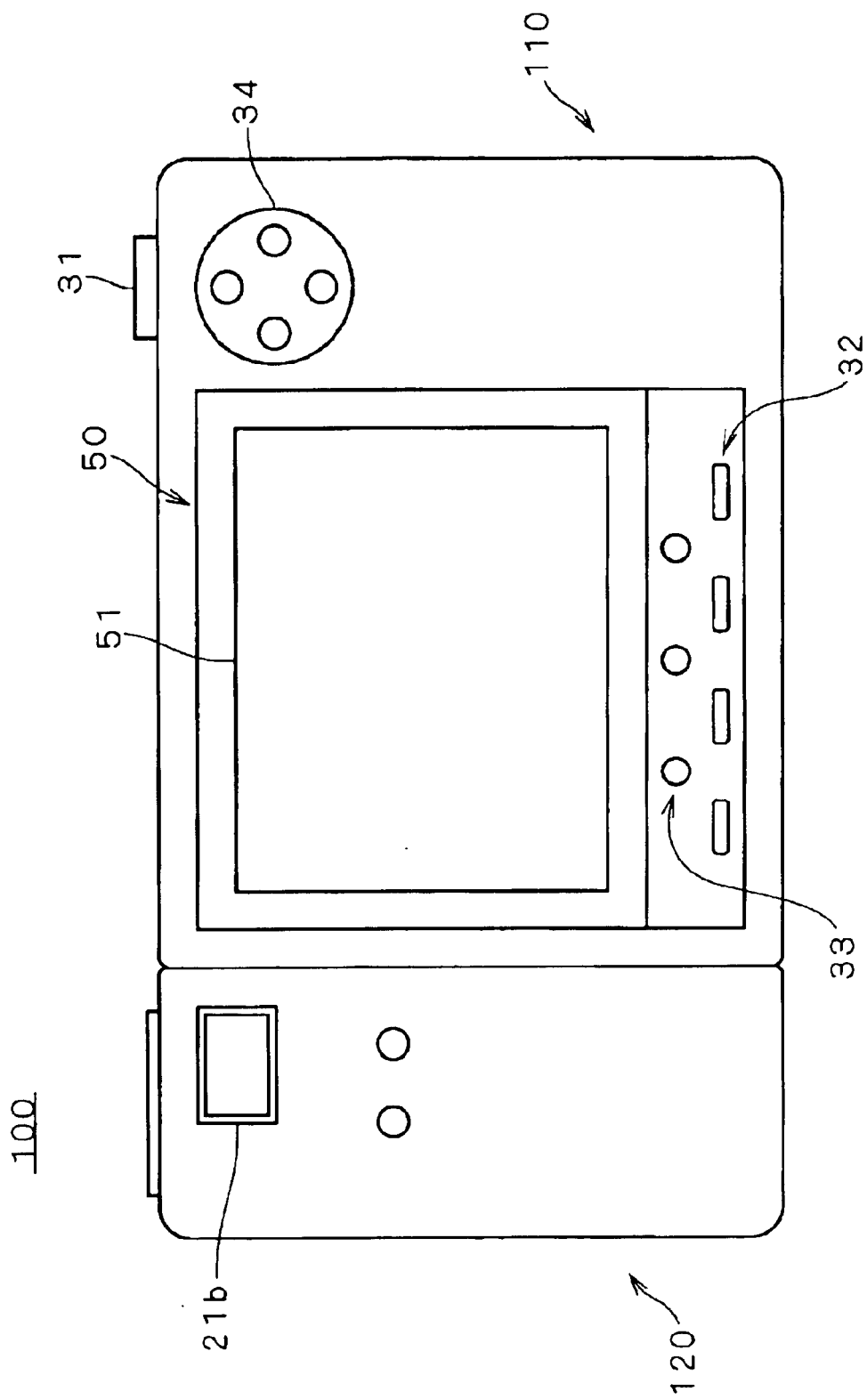
FIG. 2 shows the back of the digital camera 100.

FIG. 1 is an external view of the digital camera 100 viewed from the front. FIG. 2 shows the back of the digital camera 100.

The digital camera 100 is broadly divided into a main body 110 and an imaging optical unit 120. The imaging optical unit 120 includes a lens unit 10, an optical-finder objective window 21a, and a distance-measuring window 22a, those windows being provided on the front face. The imaging optical unit 120 also includes a built-in solid-state image sensor 9, which will be described later with FIG. 3, and peripheral circuits of the image sensor, so that an electric image signal obtained by the solid-state image sensor 9 is transferred to the main body 110.

The main body 110 includes built-in electronic circuits, e.g., a microcomputer, a flash 23 on the front face, and a release button 31 on the upper surface.

On the back of the imaging optical unit 120, as shown in FIG. 2, an optical finder 21b is provided in correspondence with the optical-finder objective window 21a of FIG. 1. Further, a display unit 50 including a rectangular color liquid crystal display (LCD) 51 is provided in the back center of the main body 110. Below the LCD 51, there are a plurality of button switches 32 including a menu button and a plurality of soft keys 33 used to choose an operator option on the LCD 51. Keys 34 arranged in the shape of a cross is used for zoom control and menu selection.

During standby, a subject image which is formed on the solid-state image sensor 9 through the lens unit 10 has been displayed on the LCD 51 almost in real time. While viewing the real-time changing image in the display unit 50, a user can capture a scene with a subject by pressing the release button 31 in any desired condition. An image signal of that image is stored in a recording medium such as a memory card. Since displaying an image on the LCD 51 is considerably power consuming, power supply to the LCD 51 can be cut off by a switch. During power supply is off, a user can preview a subject image through the optical finder 21a.

As will be described later, the digital camera 100 of the first preferred embodiment is constructed to be able to capture a same scene at a plurality of different exposure times, according to the feature of the present invention. In association with such a function, which is hereinafter referred to as a "multiple exposure mode", the button switches 32, soft keys 33, and keys 34 are also used for the following operations:

(1) Switching between the multiple exposure mode and a normal exposure mode (The latter mode is hereinafter referred to as a "single exposure mode");

(2) Selection or setting of exposure times in the multiple exposure mode;

(3) Selection of a display mode that determines how to display a plurality of images captured in the multiple exposure mode on the LCD 51; and (4) Selection and confirmation of a desired image out of a plurality of images captured in the multiple exposure mode.

Figure 3:
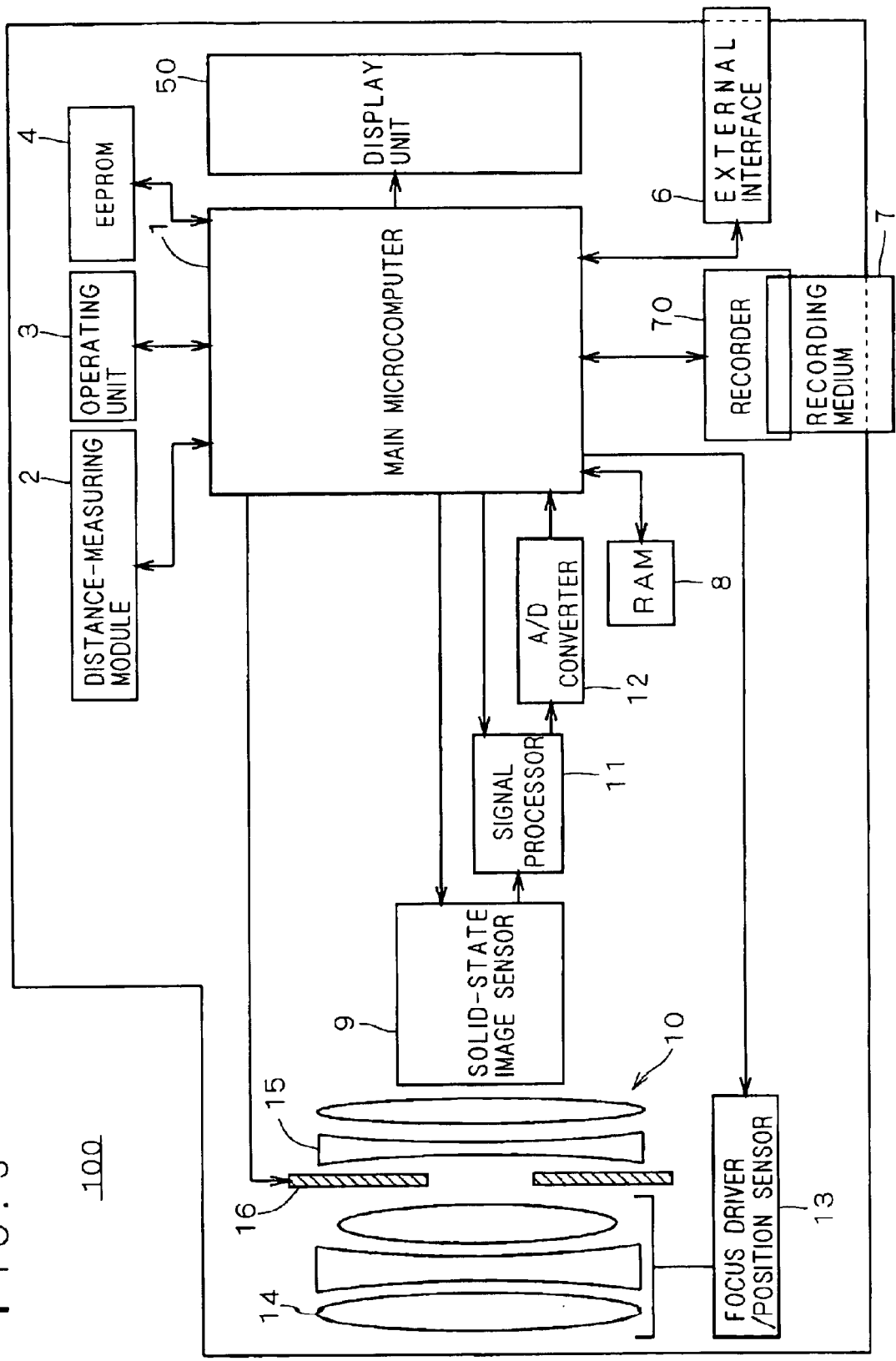
FIG. 3 is a schematic diagram of the digital camera 100.

FIG. 3 is a schematic diagram showing a functional structure of the digital camera 100. The digital camera 100 comprises a main microcomputer 1. The microcomputer 1 contains a CPU, and a memory for storing image signals temporarily and a program that defines the operation of the CPU. That is, it serves as a total controller handling the operation of each component of the digital cameral 100, which will be described later. Instead of the program-operated microcomputer 1, the total controller may be configured as hardware without a software program.

The lens unit 10 includes a focus lens group 14 and a fixed lens group 15. A focus driver/position sensor 13 locates the focus lens group 14 while driving it in a direction of the optical axis to thereby control an optical position of the lens group 14 precisely. A mechanical shutter 16 that is driven in response to a control signal from the microcomputer 1 controls opening/closing of an optical path which extends from a subject to the solid-state image sensor 9. The shutter 16 also serves as a stop.

The solid-state image sensor 9 forms a subject image through the lens unit 10. The output of the solid-state image sensor 9 is an analog image signal that is subjected to signal processing such as noise removal in a signal processor 11 and then converted into digital form by an analog-to-digital (A/D) converter 12.

The microcomputer 1 performs various processing on the digital image signal and displays an image thereof on the LCD 51 in the display unit 50 (FIG. 2). The display unit 50 shows a subject image and a menu for setting photographic conditions. The microcomputer 1 is also operable to compress the image signal in the JPEG format, for example, and stores the compressed signal into a recording medium 7 mounted in a recorder 70 having a media drive. Conversely, the image signal once stored in the recording medium 7 can be read out and displayed in the display unit 50 or subjected to various image processing. As the recording medium 7, for example, a SmartMedia card, CompactFlash card, or PC memory card that is removable from the recorder 70 can be used.

The digital camera 100 further comprises a distance-measuring module 2 for receiving reflected lights from a subject through the distance-measuring window 22a of FIG. 1 and outputting a range signal, which represents the optical distance between the digital camera 100 and a subject. An operating unit 3 includes various hand-operating elements such as the button switches 32, the soft keys 33, the keys 34 (cf. FIG. 2), and a power switch. Manual operations of these elements are entered to the microcomputer 1. A RAM 8 is used as a working memory for the microcomputer 1.

An electrically rewritable EEPROM 4 stores values obtained in a factory test for each model of the digital camera 100, and various settings obtained immediately before the power is turned off.

An external interface 6 is intended for use in inputting/outputting an image or other signal from/to a personal computer or an external monitor. It includes for example a serial connection port and an infrared port.

A-2. Function of Main Microcomputer 1

Figure 4:
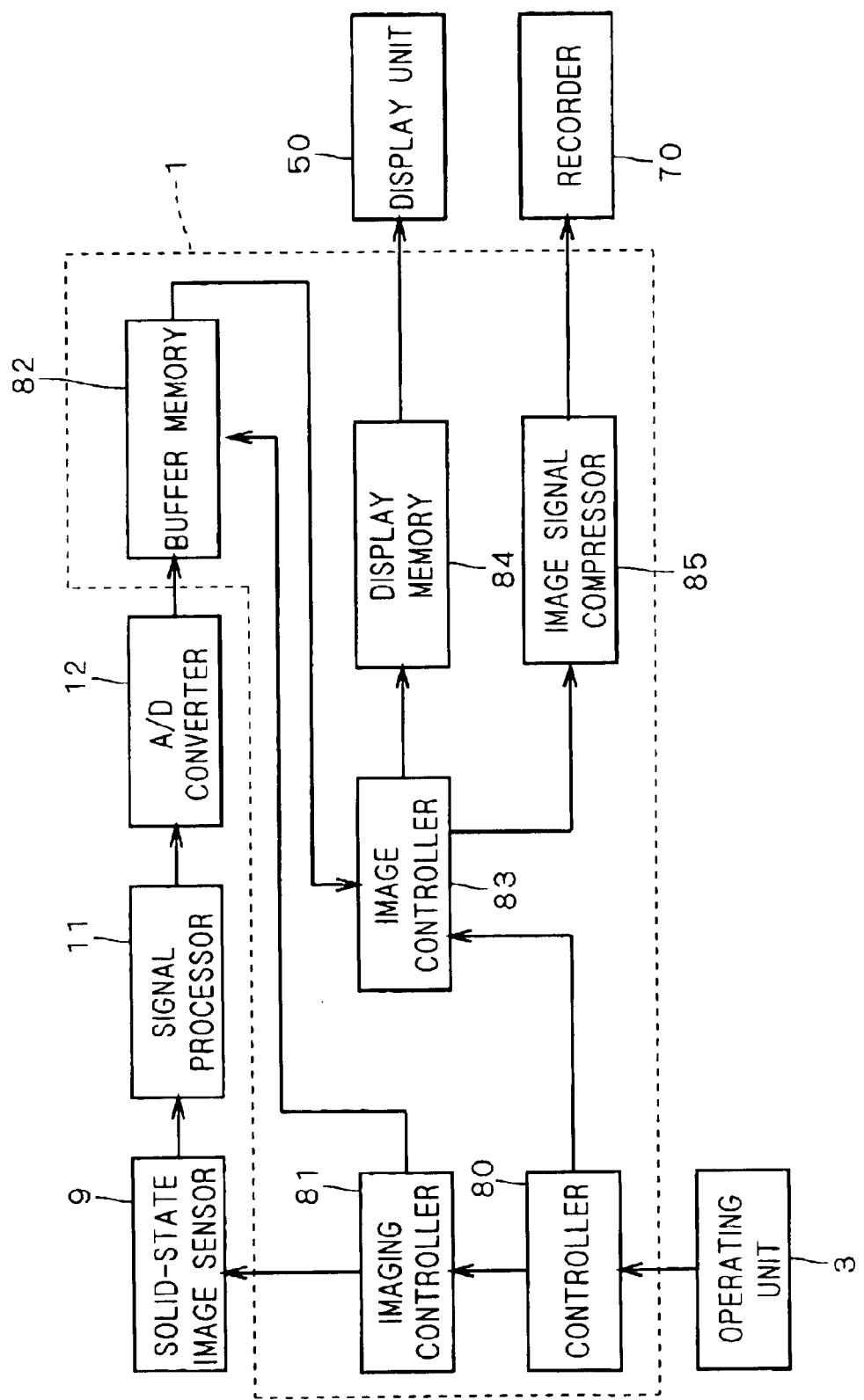
FIG. 4 is a functional block diagram of the digital camera 100.

Referring now to a functional block diagram of FIG. 4, each function of the microcomputer 1 will be described.

A controller 80 senses the user's manual operation of the operating unit 3 and outputs a control signal corresponding to the manual operation to each unit. In response to the control signal from the controller 80, an imaging controller 81 controls the solid-state image sensor 9. A buffer memory 82 once stores digital image data received from the A/D converter 12 in response to the control signal from the controller 80. The memory 82 is coupled to an image controller 83 and has a capacity of storing an image signal for a single image or a one-shot image. Alternatively, the memory 82 may be provided outside the microcomputer 1.

For displaying an image in the display unit 50, a display memory 84 once stores an image signal. An image signal compressor 85, on the other hand, compresses the image signal for example in the JPEG format and outputs the compressed signal to the recorder 70.

A-3. Structure of Solid-state Image Sensor 9

Figure 5:
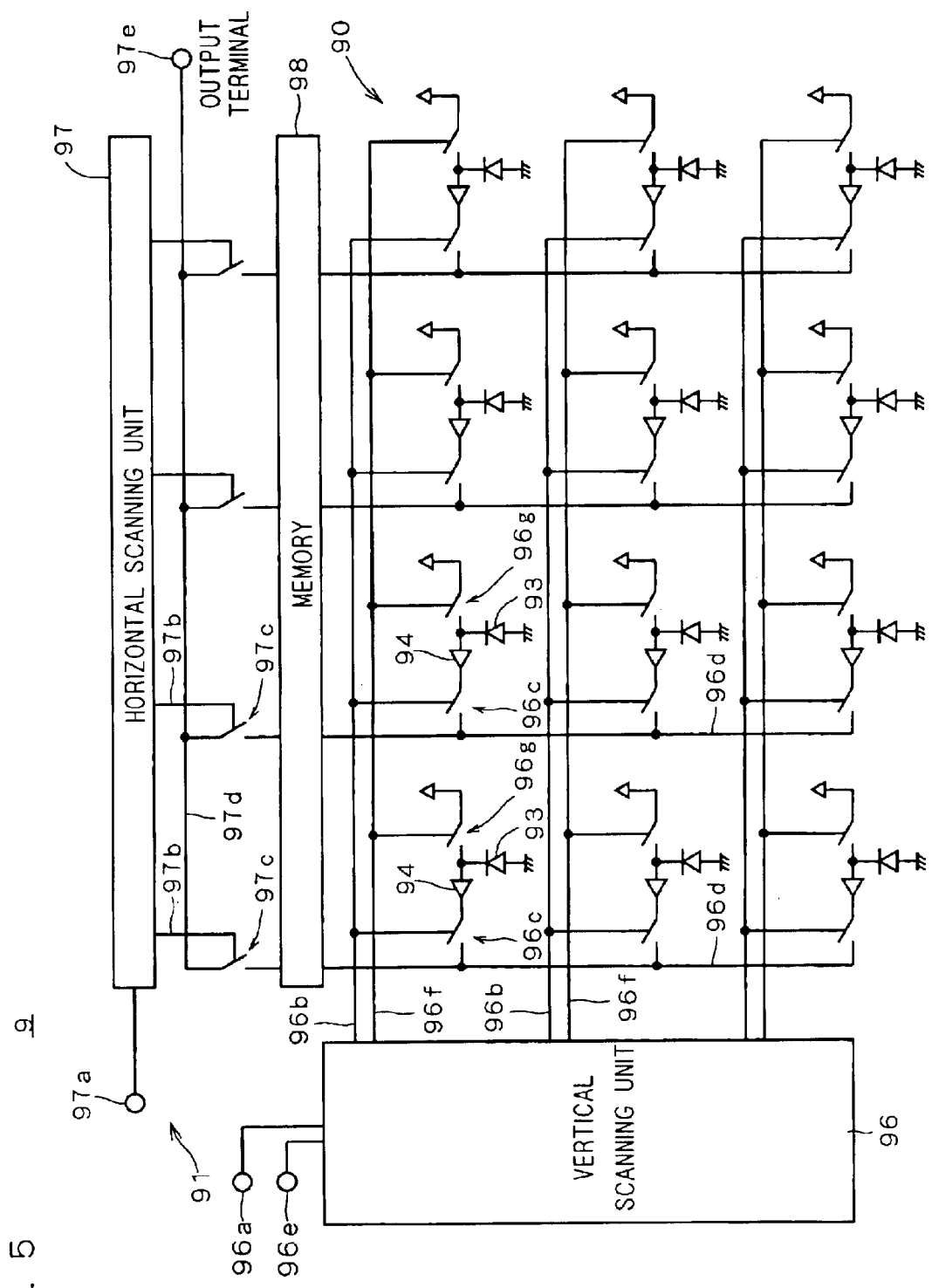
FIG. 5 is a schematic diagram showing the structure of a solid-state image sensor 9.

FIG. 5 is a schematic diagram showing main circuitry of the solid-state image sensor 9 composed principally of MOS transistors.

The solid-state image sensor 9 includes a photocell array 90 for sensing a subject image in pixels, and a read circuit 91 for reading out a signal nondestructively from each photocell.

The photocell array 90 is a two-dimensional matrix array of a plurality of photocells 93, for generating voltage according to the amount of lights in pixels. Each of the photocells 93 generates photoelectrons according to the accumulated amount of incident lights, so that the voltage corresponding to the number of photoelectrons appears across the photocell 93.

Figure 6:
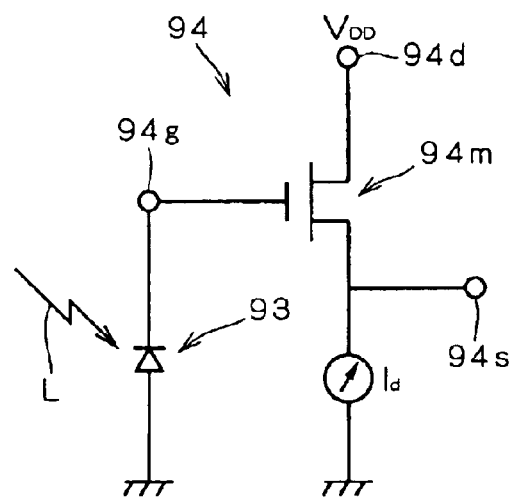
FIG. 6 shows a main structure of an amplifier 94.

The read circuit 91 includes amplifiers 94 each amplifying voltage generated by the corresponding photocell 93, a vertical scanning unit 96, a horizontal scanning unit 97, and a memory 98. As shown in FIG. 6, each of the amplifiers 94 is configured as a source follower circuit composed principally of a MOS transistor. Upon receiving a signal from the microcomputer 1 via a terminal 96*a*, the vertical scanning unit 96 performs vertical read scanning by selecting each vertical selection signal line 96*b* in sequence. The signal transferred to the selected signal line 96*b* operates ON/OFF controls of switches 96*c*, whereby an output voltage of every amplifier 94 on the active line at that time is transferred to a corresponding signal line 96*d*. Signals outputted to the signal lines 96*d* are once stored in the memory 98 which is capable of storing signals on a single horizontal line. Alternatively, the memory 98 may have a capacity to store signals of photocells on a plurality of lines.

The horizontal scanning unit 97 selects each horizontal selection signal line 97*b* in sequence upon receiving a horizontal scanning signal from the microcomputer 1 via a terminal 97*a*. The signal transferred to the selected signal line 97*b* operates ON/OFF controls of switches 97*c*, whereby each memory cell of the memory 98 is turned on in sequence and outputs voltage of signals corresponding to respective pixels to a signal line 97*d*. Signals sequentially applied to the signal line 97*d* are outputted through the signal line 97*d* from an output terminal 97*e*.

After reading out the image signals, the microcomputer 1 gives a reset command to a terminal 96*e* that is connected to the vertical scanning unit 96. At the reset command, the vertical scanning unit 96 outputs a reset signal to each reset signal line 96*f*. This reset signal turns on reset switches 96*g* to reset the photocells 93 to a reference voltage.

FIG. 6 illustrates a main structure of the amplifier 94. The amplifier 94 includes a MOS transistor 94*m*. The drain, gate, and source of the MOS transistor 94*m* are connected to a power terminal 94*d*, an input terminal 94*g* on the side of the photocell 93, and an output terminal 94*s*, respectively.

A voltage developed across the photocell 93 by photoelectrons generated by light L is applied to the gate of the transistor 94*m*. Since the output terminal 94*s* is grounded via a current source Id, the voltage at the input terminal 94*g* is outputted through amplification of a source follower. Here an insulating structure at the gate of the MOS transistor 94*m* provides electrical isolation between the input terminal 94*g* and the output terminal 94*s* of the MOS transistor 94*m*.

Such an insulating structure between the input and output of the amplifier 94 allows information on the accumulated charge to be captured from the output terminal 94*s* without information on the generated photoelectrons being destroyed.

By the use of such a characteristic of the amplifier 94, the digital camera 100 of the first preferred embodiment can obtain information on the accumulated charge in time sequence. The principle thereof is given below.

Figure 7:
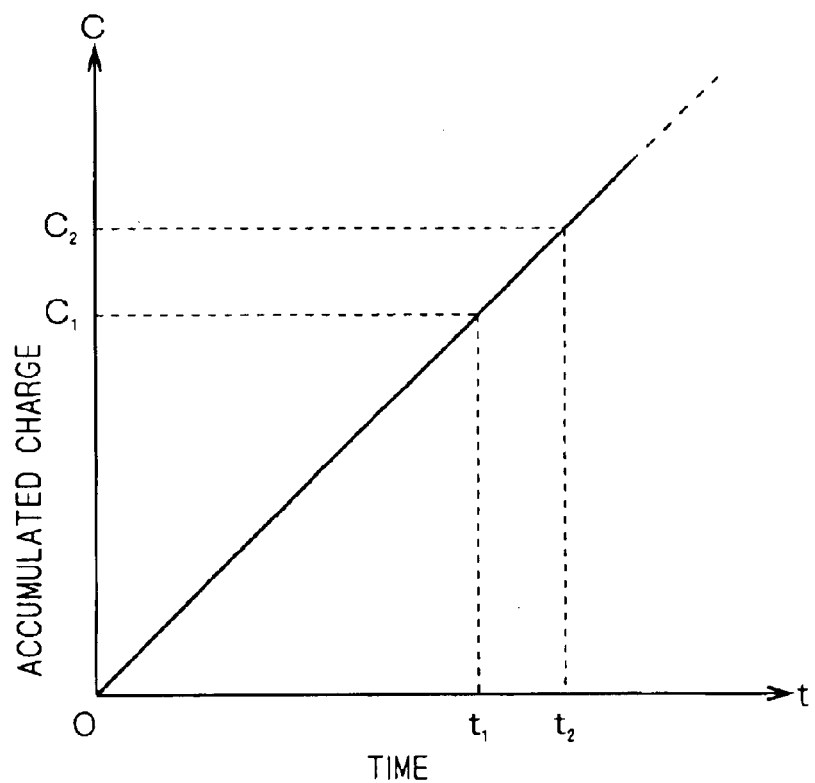
FIG. 7 shows a relationship between an exposure time and accumulated charges in the solid-state image sensor 9.

FIG. 7 shows a relationship between the exposure time and the accumulated charge in the solid-state image sensor 9. The graph is within a range that the accumulated charge in the solid-state image sensor 9 can effectively be sensed without reaching the saturation level. The horizontal axis indicates the exposure time t and the vertical axis indicates the accumulated charge C. In general, accumulated charge C linearly increases with a lapse of exposure time, but the aforementioned insulating structure in the solid-state image sensor 9 allows continuous acquisition of information on different accumulated charges C1, C2 corresponding to different exposure times t1, t2, respectively. If there is no insulating structure, the accumulated charge C1 will be reset or erased when its information is read out at time t1 and it is impossible to capture information on the accumulated charge C2 at time t2. With the above insulating structure of the read circuit, a plurality of image signals with respect to substantially the same scene are obtained in sequence at a plurality of different exposure times. Thus, a user can select an image with desired exposure from the plurality images corresponding to those signals of different exposure times. Here "substantially the same scene" refers to a state of the same subject during continued exposure. More specifically, although a subject strictly varies with a lapse of exposure time, those scenes are regarded substantially as the same scene.

Ideally the amplifier 94 described with FIGS. 5 and 6 should provide perfect electrical isolation between its input and output, but may slightly be affected by the readout of the information on the accumulated charge (e.g., reduction in charge). Since the accumulated charge and the exposure time have almost a linear relationship, even with a slight influence on the accumulated charge, the next readout of the accumulated charge C2 can be performed without a hitch if the values of exposure time are appropriately selected. For instance, if charge is reduced by a trifling amount a (not shown) when the information on the charge C1 is captured at time t1, the next information on the charge C2 is read at or later than the time point (t2+β) in consideration of the time interval β which is required for the charge C1 to increase by the reduced amount α. Accordingly, a nondestructive readout is practicable not only in the read circuit with a perfect insulating structure but also in a circuit that can minimize the influence on the accumulated charge during a readout of charge information. Such a circuit is, for example, feasible with an amplifier whose input impedance is set relatively high.

A-4. Operation of Digital Camera 100

Figure 8:
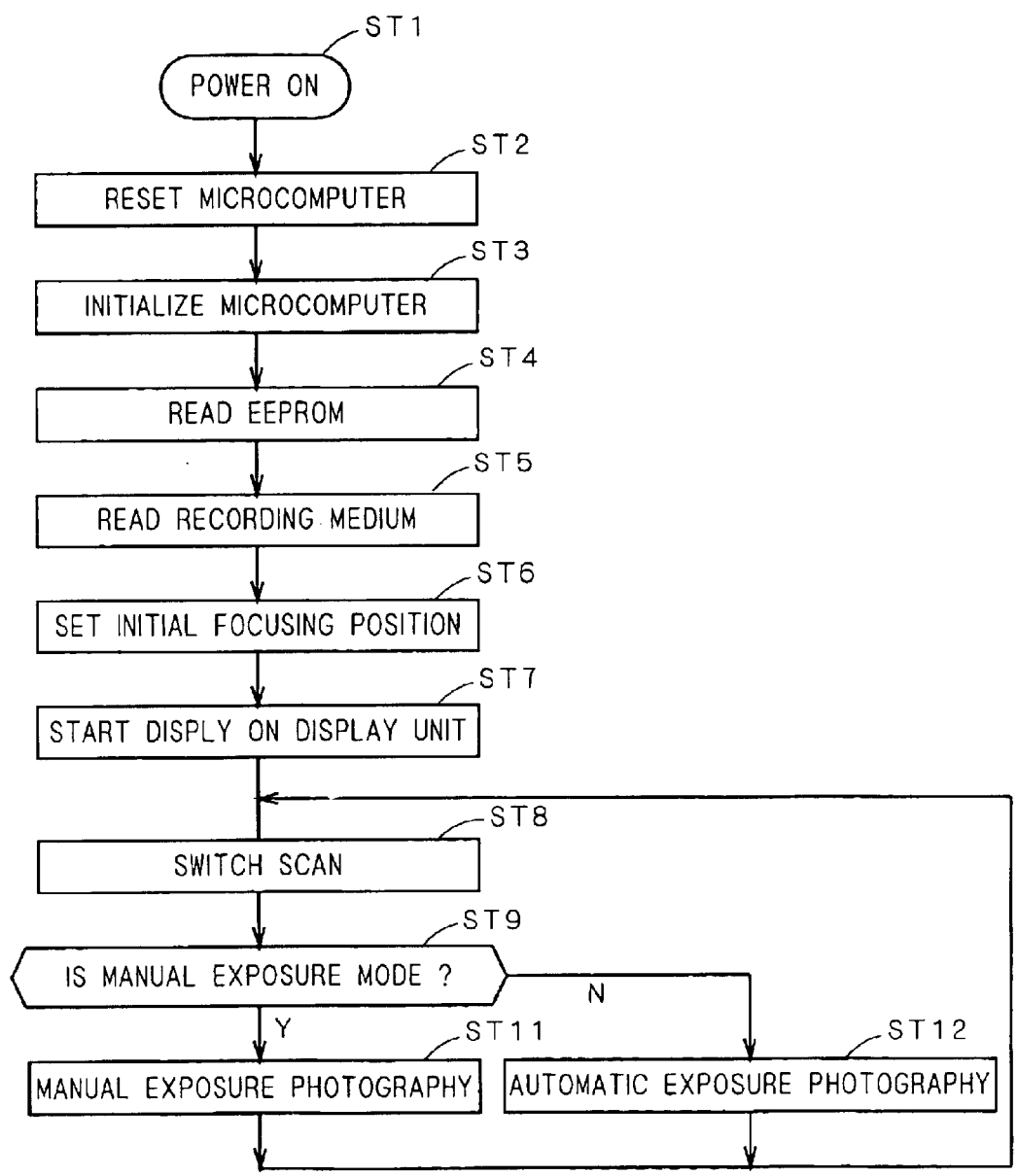
FIG. 8 is a flow chart showing a general flow of the operation of the digital camera 100.

FIG. 8 is a flow chart showing a general flow of the operation of the digital camera 100. This operation goes through a series of the following steps.

Step ST1: A user presses the power switch in the operating unit 3.

Step ST2: At power-on, the microcomputer 1 is reset.

Step ST3: Since the resetting brings each port of the microcomputer 1 in a default condition, the microcomputer 1 is initialized (e.g., a port to be used is set).

Step ST4: Set-values are read out from the EEPROM 4, where the set values may include those obtained through a factory test for each model and the status values, e.g., a flash mode and an image compression mode, representing the status just before the power was turned off in the preceding operation of the digital camera.

Steps ST5, ST6: The presence or absence of the storage medium 7, and its type and available memory capacity are checked. Then, the focus lens group 14 is moved to its initial position designated by a value being read out of the EEPROM 4 while being monitored by the focus driver/position sensor 13. Simultaneously, the microcomputer 1 outputs a control signal to the shutter 16 serving as a stop, for initial aperture setting (e.g., full aperture).

Step ST7: The display unit 50 is activated to display various settings and information as to the storage media such as available memory capacity. Then, the solid-state image sensor 9 starts outputting image data and the display unit 50 displays a captured image. Thereafter, the image sensor 9 intermittently outputs image signals and consequently the display unit 50 shows still images of the subject as a moving picture.

Step ST8: The microcomputer 1 monitors operation of the switches in the operating unit 3 while displaying a current image in the display unit 50, and waits for the next camera operation. If no manual operation by the user is performed in the operating unit 3 within a predetermined period of time, a timer function of the microcomputer 1 turns off the power for saving power consumption. Generally, the predetermined period is set to about a few minutes.

Step ST9: After sequentially going through layers of menus on the LCD 51 by the operation of the menu switch which is one of the button switches (FIG. 2), a user can select either manual exposure mode (multiple exposure mode) or automatic exposure mode (single exposure mode) with the touch of the soft switch 33. In this step ST9, the microcomputer 1 determines the exposure setting mode.

Step ST11: If a user selects the manual exposure mode, manual exposure photography is performed according to a routine that will be described with FIG. 9.

Step ST12: If a user does not select the manual exposure mode, automatic exposure photography is performed. This automatic exposure photography adopts the single exposure mode in which a single exposure time is automatically set according to shooting conditions.

After the completion of the step ST11, ST12, the process returns to step ST8.

A-5. Manual Exposure Photography

Figure 9:
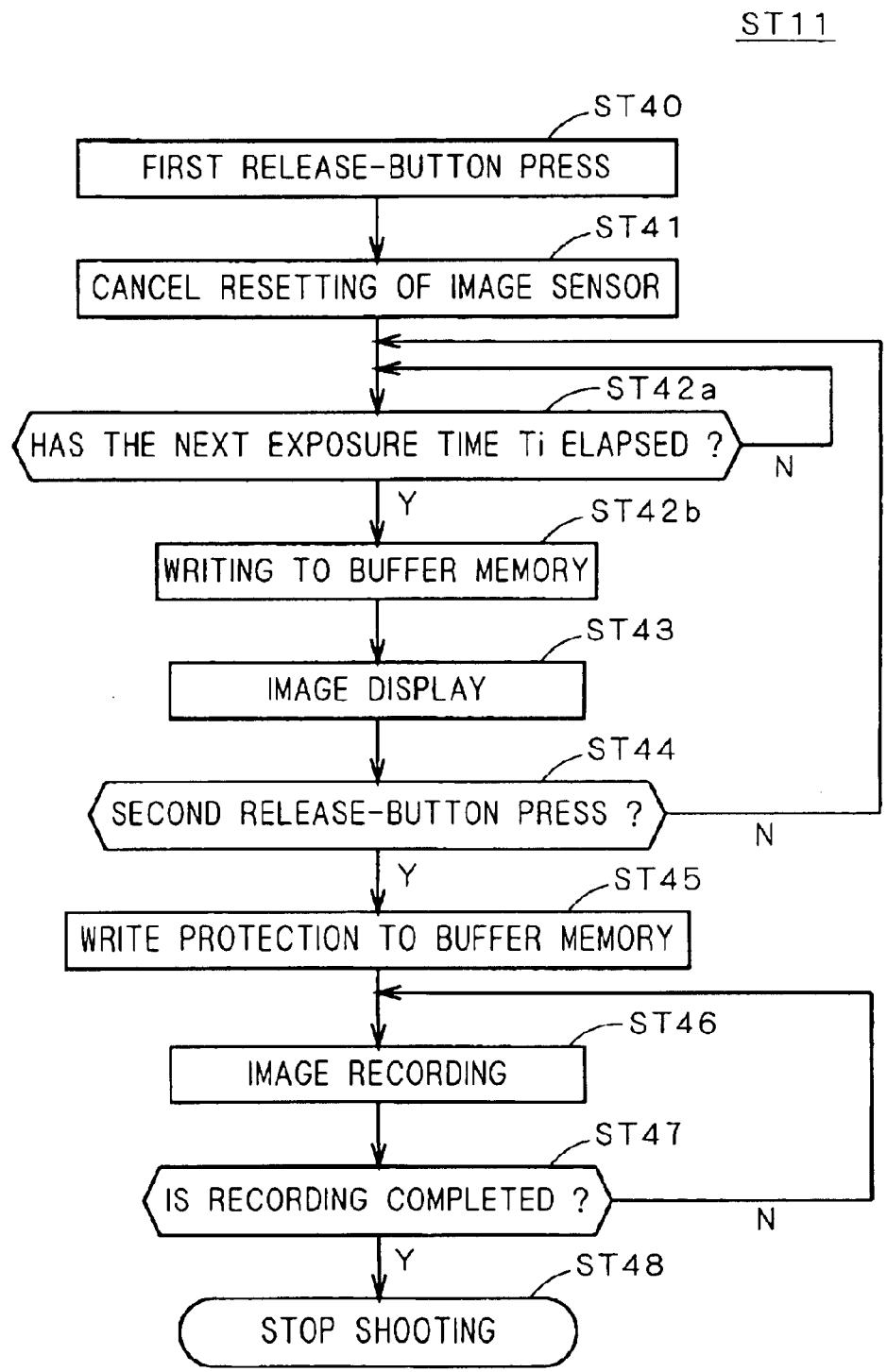
FIG. 9 is a flow chart illustrating the operation of manual exposure photography.

FIG. 9 is a flow chart illustrating the operation of the manual exposure photography which corresponds to step ST11 in the flow chart of FIG. 8.

Steps ST40, ST41: With the push of the release button 30 by a user, the operating unit 3 cancels resetting of the solid-state image sensor 9 via the controller 80 and the imaging controller 81, and the image sensor 9 begins the accumulation of electric charge of photoelectrons. In other words, this operation corresponds to the opening of an electrical shutter according to the first preferred embodiment. Further, the built-in timer of the microcomputer 1 is turned on.

Steps ST42a, ST42b: Of exposure times Ti (T1, T2, . . . ) defined at predetermined time intervals, whether the first exposure time T1 has elapsed is repeatedly checked by comparing the time T1 with the measured value of the timer. After a lapse of the time T1, the read circuit 91 of the image sensor 9 is activated to read the present information on the accumulated charge nondestructively from each photocell 93. The obtained image signal is written to the buffer memory 82 via the signal processor 11 and the A/D converter 12.

Figure 10:
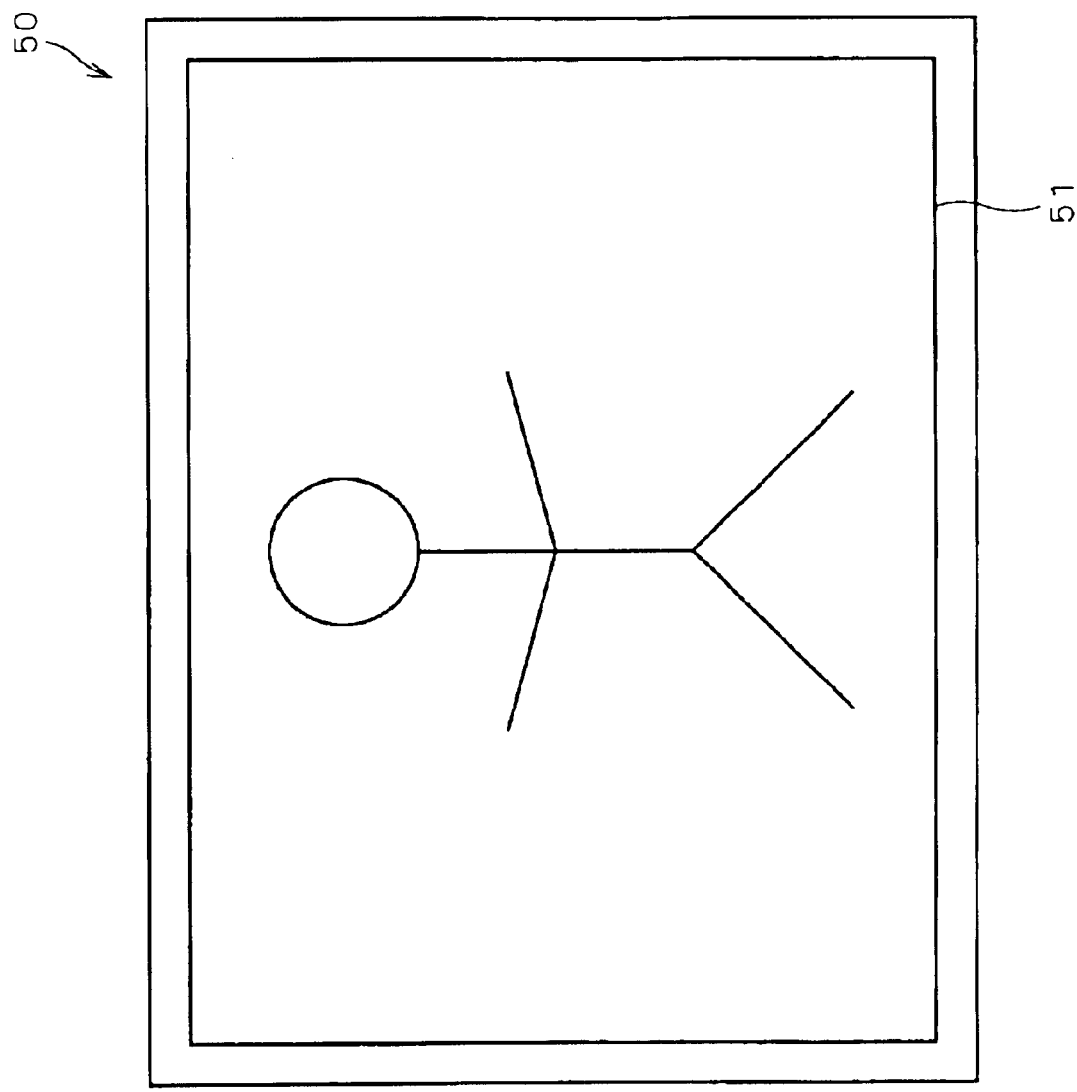
FIG. 10 shows a display of a captured image by way of example.

Step ST43: The image signal stored in the buffer memory 82 is transmitted to the display memory 84 and displayed on the entire LCD 51 in the display unit 50 as shown in FIG. 10.

Step ST44: Whether the release button 30 is pressed again or not is determined. If the button 30 is up, the process returns to step ST42a with the displayed image remaining on the LCD 51.

Step ST42a repeatedly checks whether the next exposure time Ti (e.g., T2 for the second time) has elapsed by comparing the time Ti with the measured value of the timer. After a lapse of the time Ti, the read circuit 91 of the image sensor 9 is activated to read out the present information on the accumulated charge nondestructively from each photocell 93. The obtained image signal is written to the buffer memory 82 as described before, and the image which has been displayed on the LCD 51 is replaced by the newly captured image (steps ST42b, ST43). In image updates, the old image is discarded.

By repetition of this loop to capture images corresponding to a plurality of predetermined exposure times, the LCD 51 sequentially displays images with increased exposure by a predetermined time interval with a lapse of time. That is, a brighter image than the previous one is sequentially displayed on the LCD 51.

When an image with desired exposure is displayed on the LCD 51, a user pressed the release button 30, by which the process goes to step ST45.

Steps ST45–ST48: In these steps, write protection is given to the buffer memory 82. This corresponds to the closing of the electrical shutter. The image represented by the image signal in the buffer memory 82 is transmitted by the image controller 83 to the image data compressor 85 and recorded to the recording medium 7 in the recorder 70. The completion of the image recording is the end of photography.

In the above operation, a user can specify an image to be recorded while viewing a serially-updated exposure condition on display. This allows a user to record an image that is considered at desirable exposure. This mode is suitable for photo shooting requiring a long exposure time, e.g., for capturing a night view or celestial objects.

In the case where the time interval between exposure times is considerably long, an old image captured at the previous exposure time can be transferred and stored to the recording medium 7 before the old image signal in the temporal storage memory in the main computer 1 is overwritten by an image captured at the present exposure time. In this case, a user can review each image at a later time, and select and transfer an image with desired exposure to the outside of the digital camera 1.

If the recording medium 7 stores images captured at a plurality of exposure times as described above, the LCD 51 displays those images either in sequence or in parallel after photo shooting. Then, a user selects one of them by pressing one soft key 33 assigned as an OK button. At this time, image signals other than the selected one may be erased automatically.

Since the old image in the buffer memory 82 is discarded whenever a displayed image is replaced, the buffer memory 82 only stores the latest image, i.e., image with the longest exposure time out of all captured images. This practically poses no problem because in most cases, images captured at previous exposure times are considered unnecessary by a user.

B. Second Preferred Embodiment

B-1. Construction of Digital Camera 100A

A digital camera 100A according to a second preferred embodiment of the present invention has the same hardware construction as the camera 100 of the first preferred embodiment in FIG. 3 but differs in the structure for controlling a microcomputer 1A.

Figure 11:
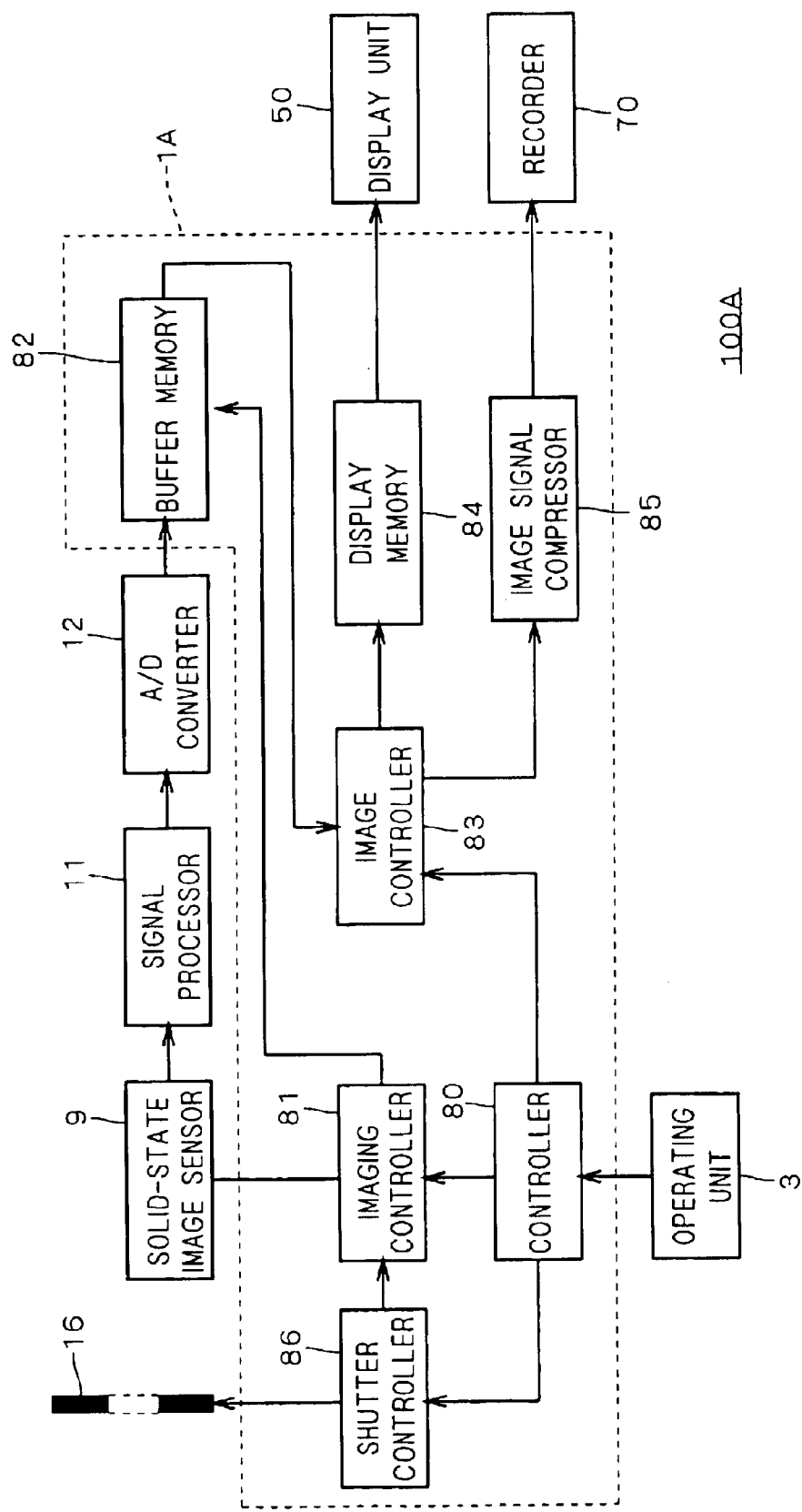
FIG. 11 is a functional block diagram of a digital camera 100A according to a second preferred embodiment of the present invention.

FIG. 11 is a functional block diagram of the digital camera 100A which is operated by software. Enclosed by the virtual line are the functions of the microcomputer 1A. As compared to the construction of the first preferred embodiment in FIG. 4, a shutter controller 86 for controlling the opening/closing of the mechanical shutter 16 on the basis of the control signal from the controller 80 is additionally provided for the control of the multiple exposure mode. The controller 86 is also provided in the digital camera 100 of the first preferred embodiment, but the camera 100 controls the operation of the multiple exposure mode with an electrical shutter and thus the mechanical shutter 16 is not used to adjust exposure times in the multiple exposure mode.

B-2. Operation of Digital Camera 100A

A general flow of the operation of the digital camera 100A is almost the same as the flow chart of FIG. 8 but only the operation of manual exposure photography is different from that in FIG. 9. The following is a detailed description of the manual exposure photography according to the second preferred embodiment.

Figure 12:
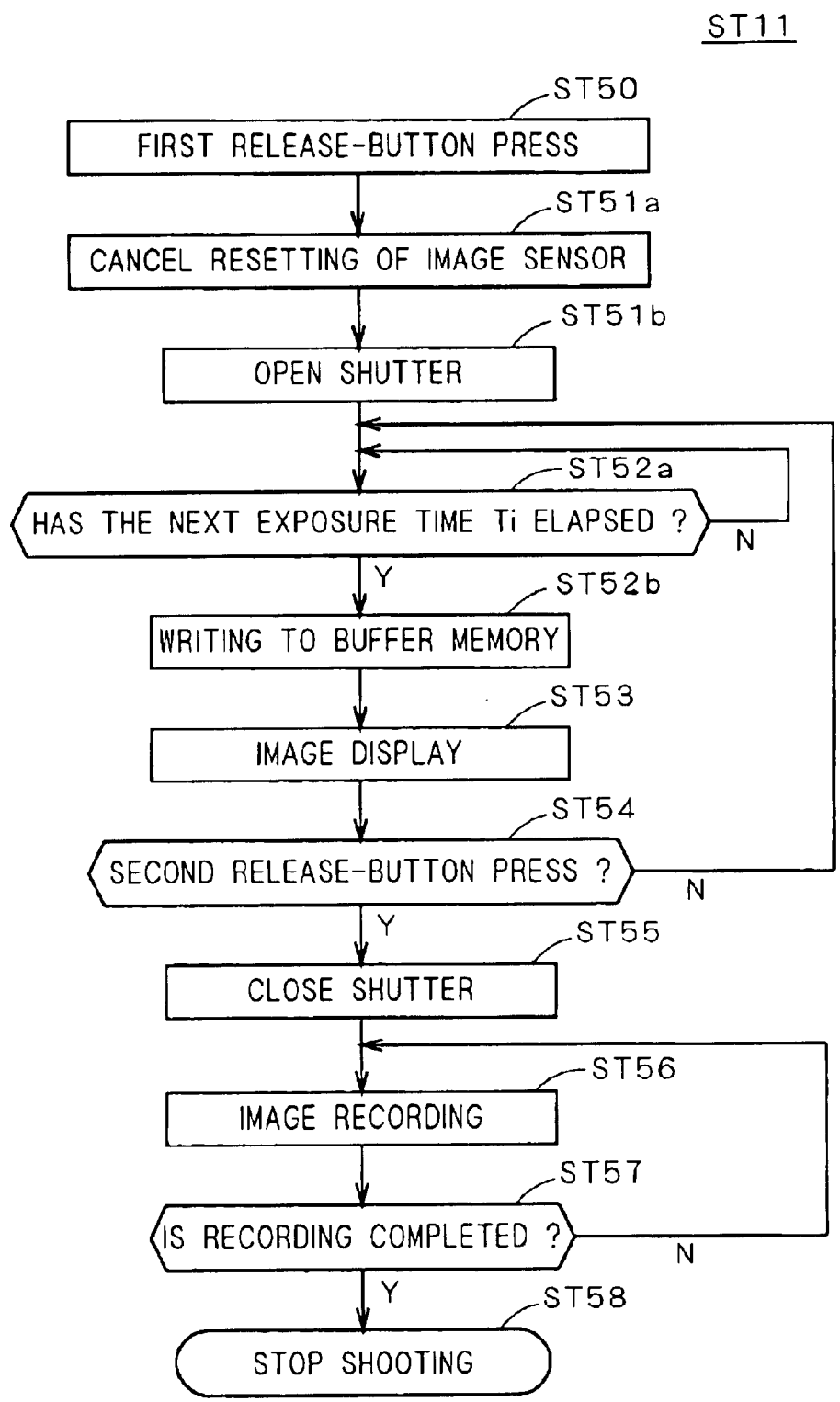
FIG. 12 is a flow chart illustrating a preparatory operation for manual exposure photography.

FIG. 12 is a flow chart illustrating a preparatory operation for the manual photography in the digital camera 100A which corresponds to step ST11 in the flow chart of FIG. 8. Steps ST50 to ST58 in this flow chart are almost the same as the steps in FIG. 9 except steps ST41 and ST45. The detail is given below.

While steps ST41 and ST45 in FIG. 9 are the opening/closing operations of the electronic shutter relying on the characteristic of the solid-state image sensor 9, steps ST51b and ST55 in FIG. 12 are the opening/closing operations of the mechanical shutter 16. More specifically, the shutter controller 86 opens and closes the mechanical shutter 16 in steps ST51b and ST55, respectively, on the basis of the signal received from the controller 80.

A plurality of captured images are sequentially removed in historical order as in the first preferred embodiment.

The above construction and operation of the digital camera 100A enables a user to specify an image to be recorded while viewing a serially-updated exposure condition on the display as in the first preferred embodiment. Accordingly a proper image can be selected and recorded. This mode is suitable for photo shooting requiring a long exposure time, e.g., for capturing a night view or celestial objects.

C. Third Preferred Embodiment

C-1. Construction of Digital Camera 100B

Figure 13:
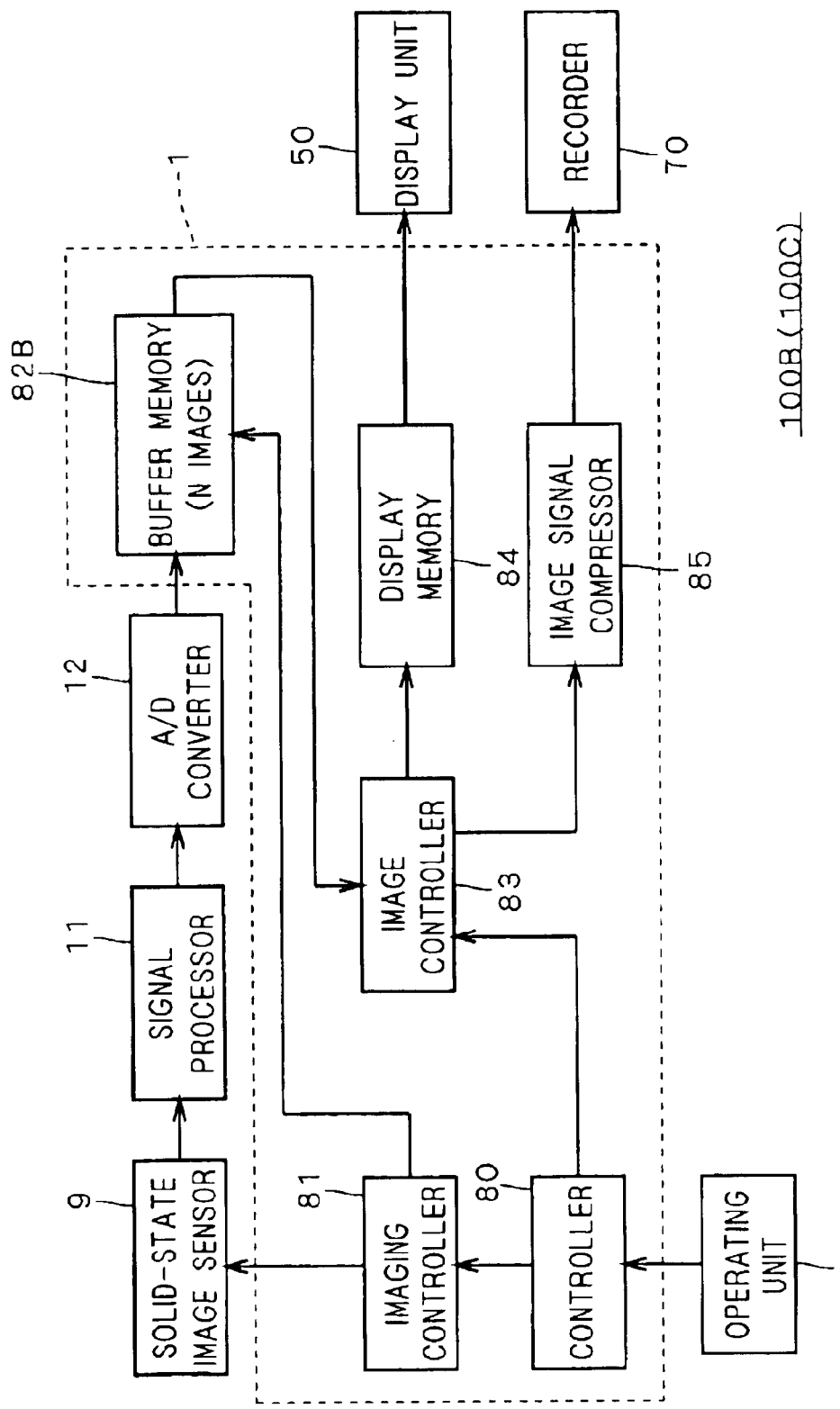
FIG. 13 is a functional block diagram of digital cameras 100B and 100C according to third and fourth preferred embodiments of the present invention, respectively.

FIG. 13 is a functional block diagram of a digital camera 100B according to a third preferred embodiment of the present invention. While the buffer memory 82 in the first and second preferred embodiments has a storage capacity of only an image signal for a single image of a predetermined reference size, a buffer memory 82B of the digital camera 100B has a storage capacity of image signals for N-images each having the reference size, where the number N is an integer larger than one. The other part of the digital camera 100B is identical to that of the digital cameras 100, 100A of the first and second preferred embodiments.

C-2. Operation of Digital Camera 100B

A general flow of the operation of the digital camera 100B according to the third preferred embodiment is almost the same as the flow chart of FIG. 8 but only the operation of manual exposure photography is different from that in FIG. 9. The following is a detailed description of the manual exposure photography according to the third preferred embodiment.

Figure 14:
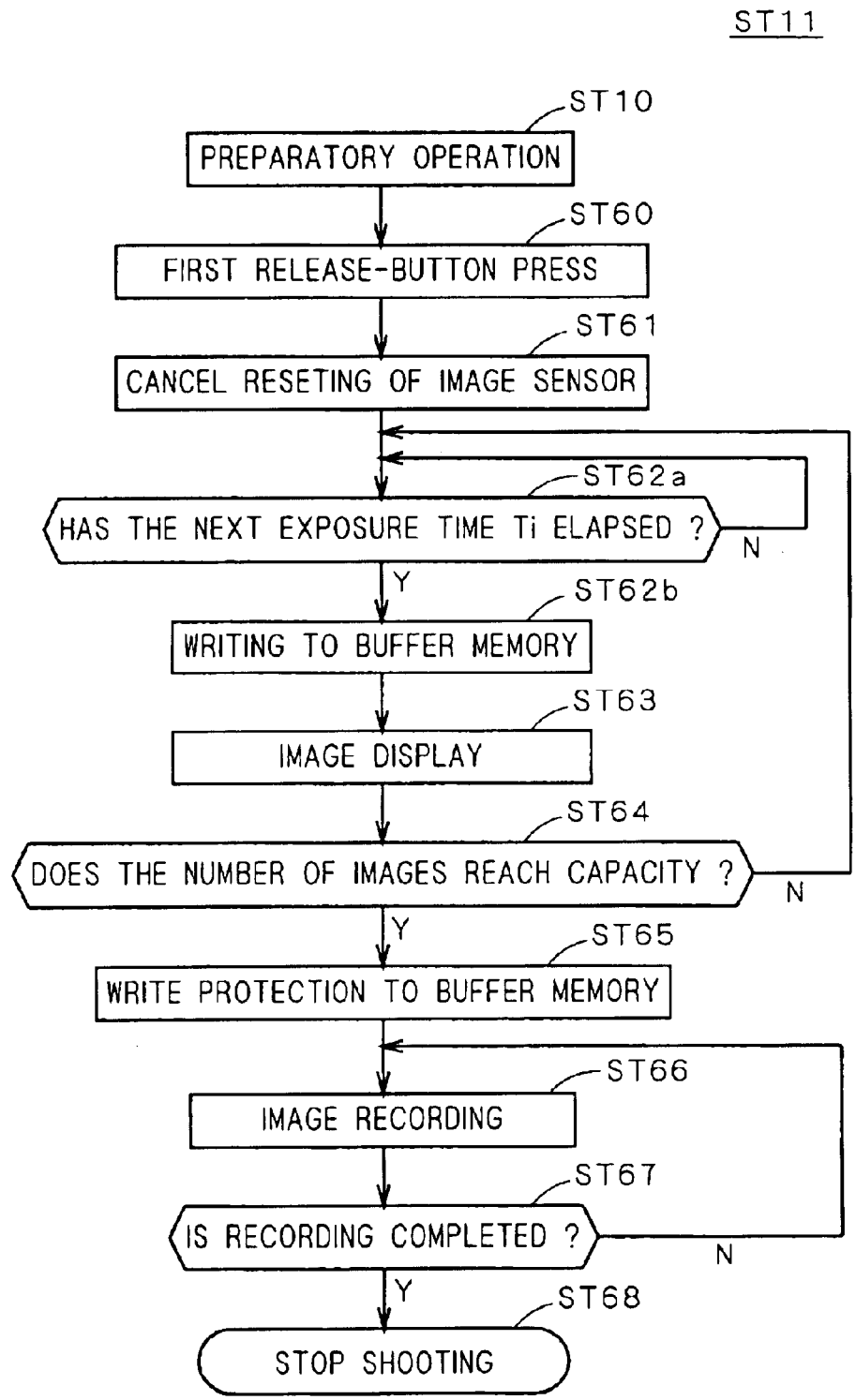
FIG. 14 is a flow chart illustrating a preparatory operation for manual exposure photography in the digital camera 100B according to the third preferred embodiment of the present invention.

FIG. 14 is a flow chart illustrating a preparatory operation for the manual photography in the digital camera 100B which corresponds to step ST11 in the flow chart of FIG. 8. Steps ST60 to ST68 in this flow chart are almost the same as the steps in FIG. 9 except step ST44 in FIG. 9 and an additional step ST10. The operations of steps ST10 and ST64 corresponding to step ST44 will be described below.

C-3. Operation of Step ST10

Since the digital camera 100B comprises the buffer memory 82B with a storage capacity of image signals for N-images, times to capture the N pieces of image data are desirably set prior to photo shooting. For this reason, a new mode (step ST10) of making preparations for manual photography is added to the process, in which exposure times are set for example by the operation of switches.

Figure 15:
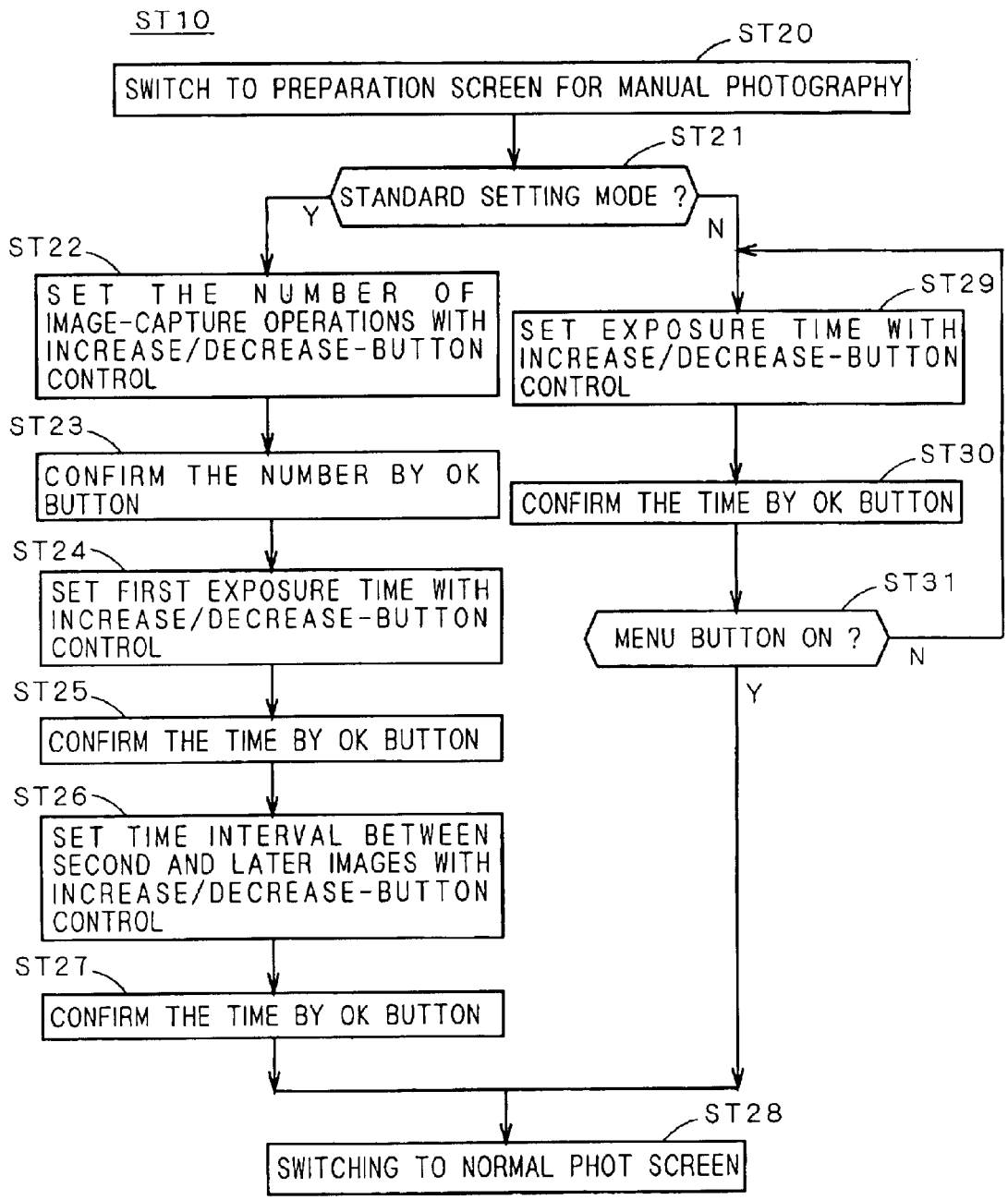
FIG. 15 is a flow chart illustrating a preparatory operation for manual exposure photography.

FIG. 15 is a flow chart illustrating the preparatory operation for manual photography, corresponding to step ST10.

Figure 16:
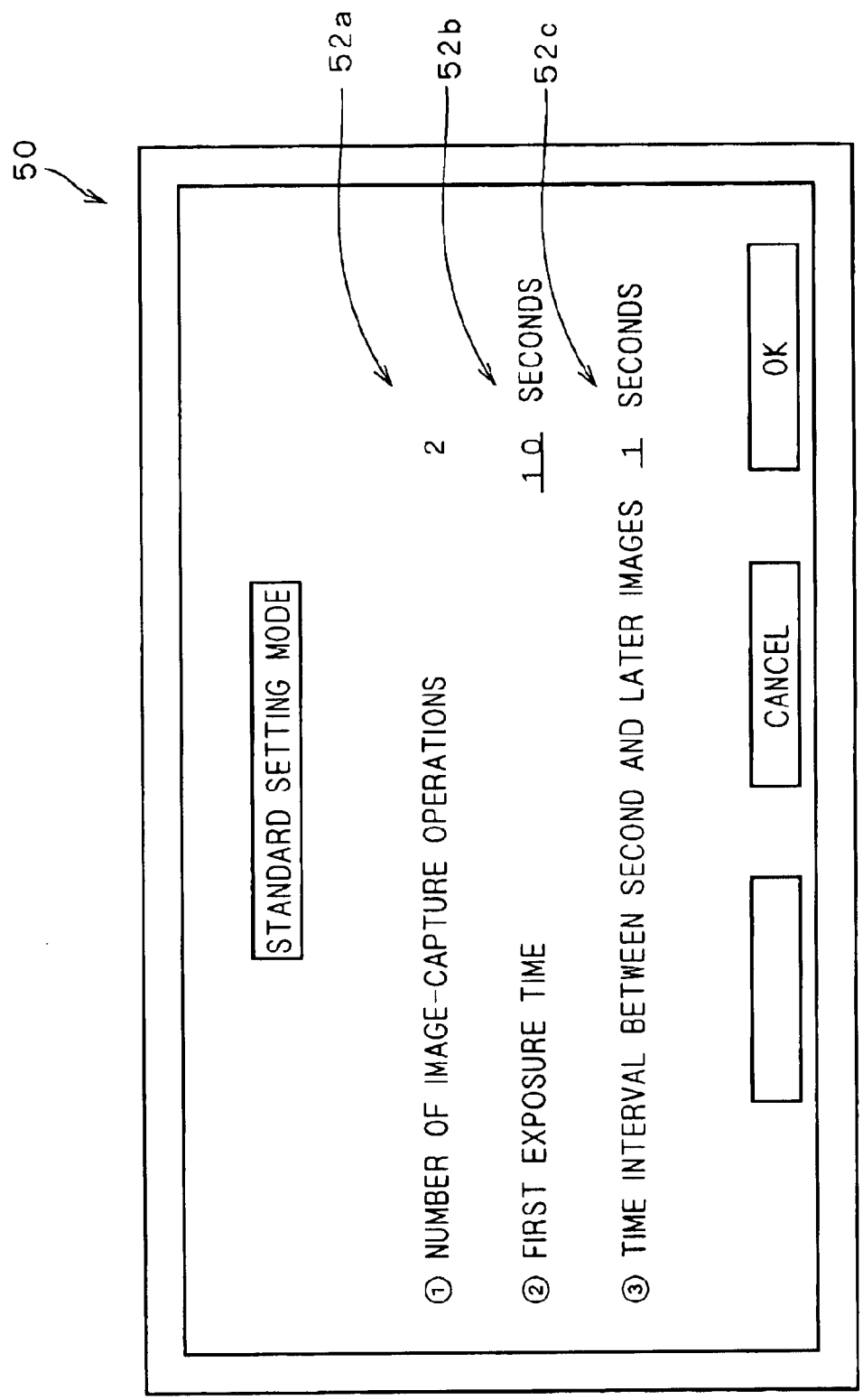
FIG. 16 shows a screen for exposure time setting.

Step ST20: If the manual exposure mode is selected, a standard setting mode screen appears on the display unit 50 (LCD 51) as shown in FIG. 16.

Step ST21: This step determines whether the standard setting mode is selected. The determination is made by whether a mode selection button, one of the soft switches 33, is pressed again. If the button is not pressed within a predetermined period of time, the standard setting mode is assumed and the process goes to step ST22. If the button is pressed within a predetermined period of time, i.e., any other setting mode is selected, the process goes to step ST29.

Steps ST22, ST23: On the standard setting mode screen in FIG. 16, the number of image-capture times is set. For the setting, a numeric value in a numerical field 52a is increased/decreased by the operation of the keys 34 (FIG. 2) as increase/decrease buttons. For an unlimited number of times or infinite number of times, a "0" is entered. Then, the entered number is confirmed by pressing one of the soft keys 33 assigned as the OK button.

Steps ST24, ST25: A first exposure time is also set by increasing/decreasing a numeric value in a numerical field 52b with the increase/decrease-button control and confirmed by the OK button.

Steps ST26–ST28: Similarly, a time interval between the second and later images is set by increasing/decreasing a numeric value in a numerical field 52c and confirmed by the OK button. The order of this setting is not only limited to the above example; for example, the time setting may be made before the number setting. After that, the screen is switched to a normal photo screen.

Information about a plurality of different exposure times Ti (T1, T2, . . . , Tn: the number n is an integer of at least one) is set as described above. If no limit is placed on the number of image-capture times and a command to stop exposure is given manually, this is equivalent to the case where the n is set to infinite.

Figure 17:
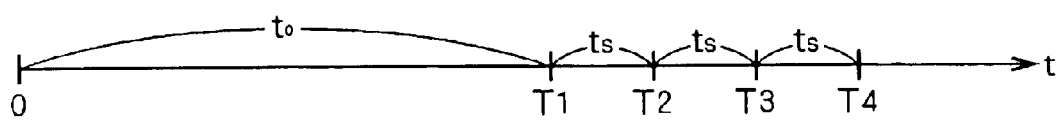
FIG. 17 shows how to set a plurality of exposure times by way of example.

According to the values set in the above standard setting mode, a plurality of exposure times are automatically set as shown in a timing chart of FIG. 17. In FIG. 17, the horizontal axis indicates time, where the time $t_0$ is the first exposure time and the time $t_s$ is the time interval between the second and later images. In this case, the first image signal is read out after a lapse of relatively a long period of time from start of exposure, and the second and later image signals are read out at relatively short time intervals. That is, the times to capture images are variable. Such offset-time (the first exposure time $t_0$) prevents the camera from capturing an underexposed initial image and increases the efficiency in capturing images at desired exposures.

Referring back to FIG. 15, we will continue the description.

Figure 18:
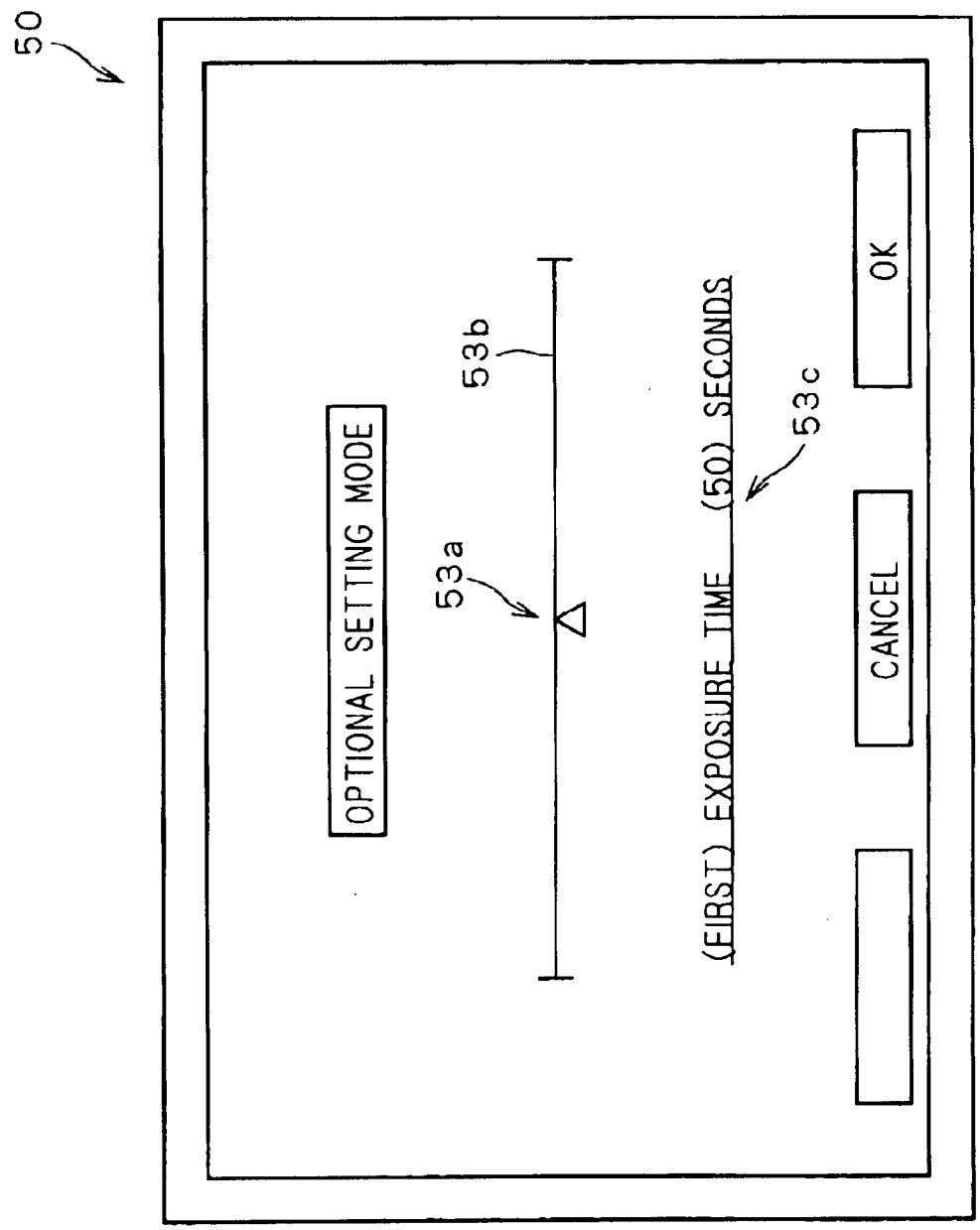
FIG. 18 shows a screen for exposure time setting.

Steps ST29, ST30: The screen is switched to an optional setting mode screen shown in FIG. 18 on which a plurality of exposure times are set. On this screen, a user moves an inverted delta cursor 53a along a time axis 53b by the operation of the increase/decrease button and stops the cursor on a time to be set. A user can perform this operation while confirming time display in a setting field 53c that corresponds to the position of the cursor 53a. The set time is then confirmed by pressing the OK button. Preferably the cursor 53a is displayed in a different color after the confirmation so that a user can review it on the screen.

Step ST31: This step determines whether the menu button is pressed. If the menu button is down, the optional setting mode is terminated and the screen is switched to the normal photo screen of step ST28. If the selector button 61 is not down, on the other hand, the process returns to step ST29 and the next exposure setting begins.

If the camera has a function to previously measure subject brightness, the times $t_0$, $t_s$ may automatically be set according to the measured result without the preparatory operation. For example, they may be set short when a subject is in relatively bright conditions and long when a subject is in relatively dark conditions.

C-4. Operation of Step ST64

Although step ST44 in FIG. 9 determines whether a user presses the release button 30 again, step ST64 determines whether the number of images which have sequentially been captured at predetermined time intervals reaches a predetermined number M (M≦N where M is an integer larger than one). If the number of images is less than M, the process returns to step ST62a and after a lapse of the next time interval, a new image is written to the buffer memory 82B in ST62b. If the number reaches M, the process goes to step ST65 and writing to the buffer memory 82B is forcefully terminated.

The predetermined number M is set in the preparatory operation by entering a numeric value in the numerical field 52b of FIG. 16 with the increase/decrease-button control. At this time, a user can enter only numbers equal to or less than N, the number of images that can be stored in the buffer memory 82B. This prevents overflow writing of images to the buffer memory 82B in step ST62b.

In step ST66, M-images captured at different exposure times are recorded to the recording medium 7 in the recorder 70 via the compressor 85. Since those images are substantially the same scene and thus there is not much difference therebetween, the compressor 85 can efficiently compress them by arithmetic operations such as a differential operation. This improves storage efficiency of the recording medium 7.

Figure 19:
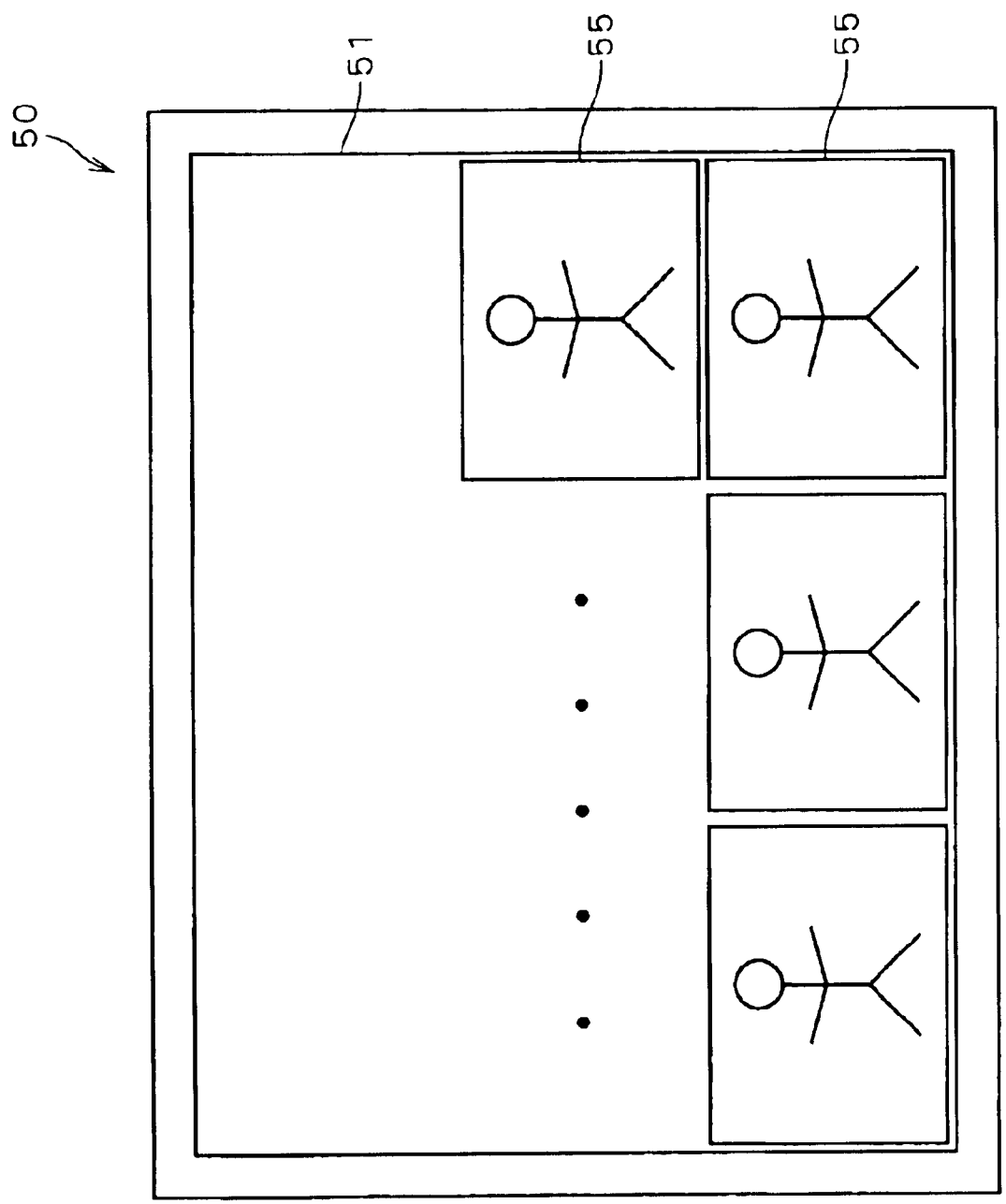
FIG. 19 shows a parallel display of captured images by way of example.

During the manual exposure photography (step ST11), a user can switch between sequential display of the latest image as shown in FIG. 10 and parallel display of a plurality of images 55 captured at different exposure times as shown in FIG. 19, by pressing the selector switch. On the parallel display, however, each image is displayed as a thumbnail image with more pixels skipped as compared to an image in the sequential display.

On the sequential display as shown in FIG. 10 according to the third preferred embodiment, since the buffer memory 82B stores images with different exposure times, images are displayed one after another on the LCD 51 in either a forward or a reverse direction. Thus, when an image with desired exposure is displayed, a user presses the OK button to adopt it. On the parallel display of a plurality of images as shown in FIG. 19, a user moves the cursor to an image with desired exposure by the keys 34 and presses the OK button to adopt it.

Through the above-described operation, the digital camera 100B of the third preferred embodiment can effectively capture images at a plurality of exposure times with respect to substantially the same scene, only by a single shot.

D. Fourth Preferred Embodiment

D-1. Construction of Digital Camera 100C

A digital camera 100C according to a fourth preferred embodiment of the present invention has the same construction as the camera 100B of the third preferred embodiment (FIG. 13) but differs in the way of using the buffer memory 82B. The following is a detailed description of the operation of the digital camera 100C. For convenience, reference numerals to be used are the same as used for the functional blocks of the digital camera 100B of the third preferred embodiment in FIG. 13.

D-2. Operation of Digital Camera 100C

A general flow of the operation of the digital camera 100C according to the fourth preferred embodiment is almost the same as the flow chart of FIG. 8 but only the operation of manual exposure photography is different from that in FIG. 9. The following is a detailed description of the manual exposure photography according to the fourth preferred embodiment.

Figure 20:
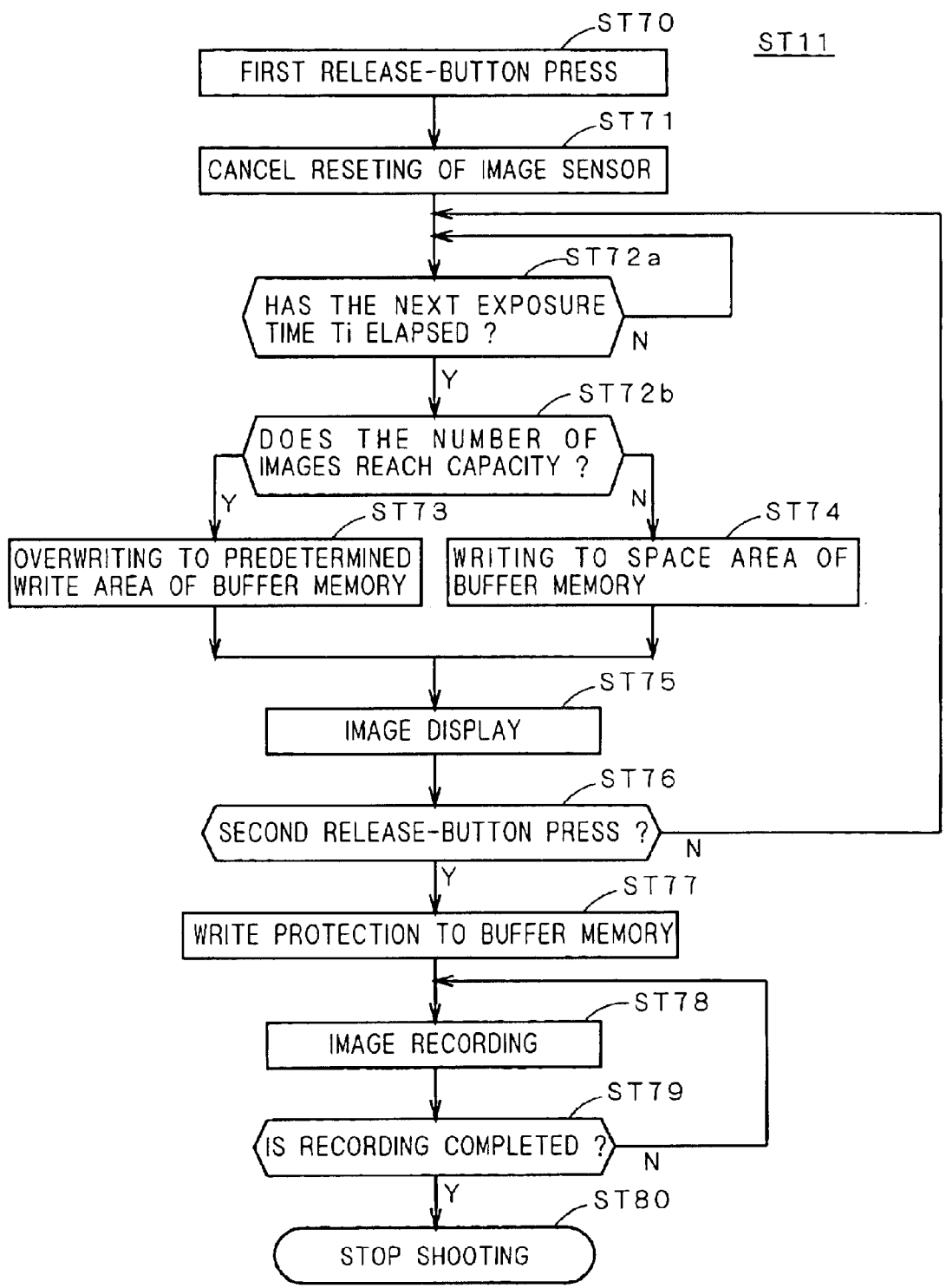
FIG. 20 is a flow chart illustrating a preparatory operation for manual exposure photography in the digital camera 100C according to the fourth preferred embodiment of the present invention.

FIG. 20 is a flow chart illustrating a preparatory operation for the manual photography in the digital camera 100C, which corresponds to step ST11 in the flow chart of FIG. 8. Steps in this flow chart are almost the same as those of the first preferred embodiment except step ST42b in FIG. 9. In step ST42b, since the buffer memory 82 has a storage capacity of only an image signal for a single image, each new image signal which is sequentially captured at predetermined time intervals is simply written over the old image signal. This requires no complex control. The buffer memory 82B of the digital camera 100C, on the other hand, has a storage capacity of image signals for N-images, so that it is desirable to make the effective use of this capacity. For this reason, step ST42b is replaced by steps ST72b, ST73, and ST74. The operations of these steps are given below.

Step ST72b determines whether the number of images which have been captured in sequence at predetermined time intervals exceeds the maximum limit number N of images that can be stored in the buffer memory 82B. If the number of images already captured is larger than the limit number N, the process goes to step ST73 where the oldest image signal in the buffer memory 82B is erased and a new image signal is stored, i.e., overwriting of old with new. If the current number does not exceed the limit number N, a new image signal is written to a space area in the buffer memory 82B. This allows an effective use of the buffer memory 82B and avoids the necessity of limiting the number of image signals obtainable for the same scene, which was necessary in the third preferred embodiment.

In image signal recording of step ST78, the compressor 85 performs effective compression of image signals by arithmetic operations as described in the third preferred embodiment. Further, a user can switch between the sequential display of only the latest image signal and the parallel display of a plurality of images by pressing the selector button.

The procedure for selecting any desired image out of a plurality of captured images is as described in the third preferred embodiment.

The digital camera 100B of the third preferred embodiment needs the preparatory operation (step ST10 in FIGS. 14) for manual photography since only M-images can be captured. The digital camera 100C, on the other hand, has no limitation on the number of images to be captured, so that no operation corresponding to step ST10 is necessary. Thus, exposure times are set at default time intervals.

Through the above-described operation, the digital camera 100C of the fourth preferred embodiment can also effectively capture images at a plurality of exposure times with respect to substantially the same scene, only by a single shot. It further performs the additional function as will be described below. For prolonged exposure of a subject in dark conditions, e.g., capturing celestial objects in the nighttime, the multiple exposure at relatively short intervals $t_0$ will produce a number of images, and in consideration of the memory capacity, it is difficult to store all of them. However too long intervals $t_0$ might miss an occasion to capture an image with correct exposure.

One approach is to store only a limited number M of new images without setting too long intervals $t_0$. In this case, underexposed old images are removed and only a plurality of images around at correct exposure are stored. Thus, a user can select an image with desired exposure from those limited number of images.

As described so far, the digital camera 100C of the fourth preferred embodiment combines both advantages of the digital cameras 100, 110A of the first and second preferred embodiments and the digital camera 100B of the third preferred embodiment.

E. Fifth Preferred Embodiment

E-1. Construction of Digital Camera 200

Figure 21:
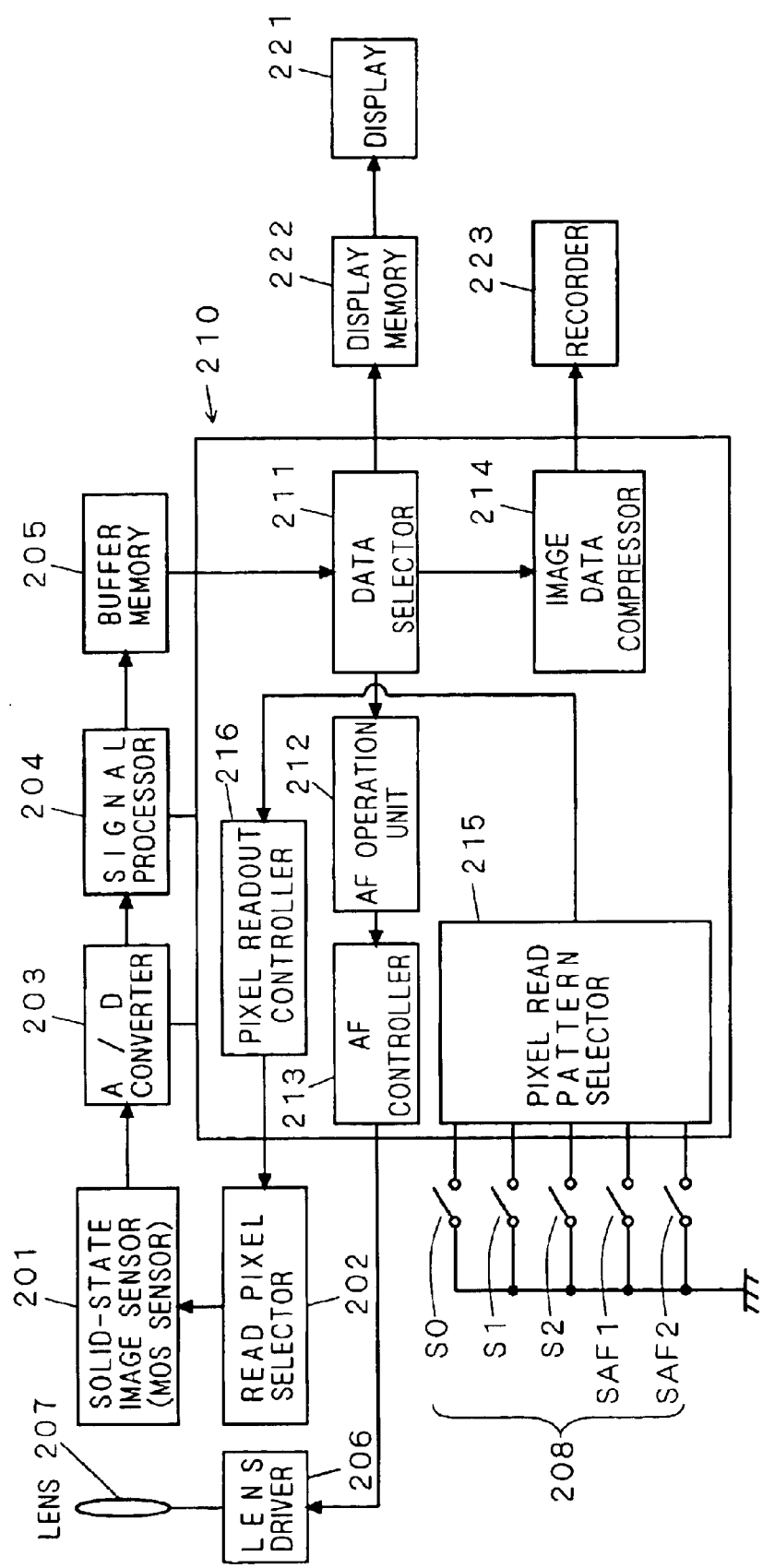
FIG. 21 is a block diagram showing a construction of a digital camera 200 according to a fifth preferred embodiment of the present invention.
Figure 22:
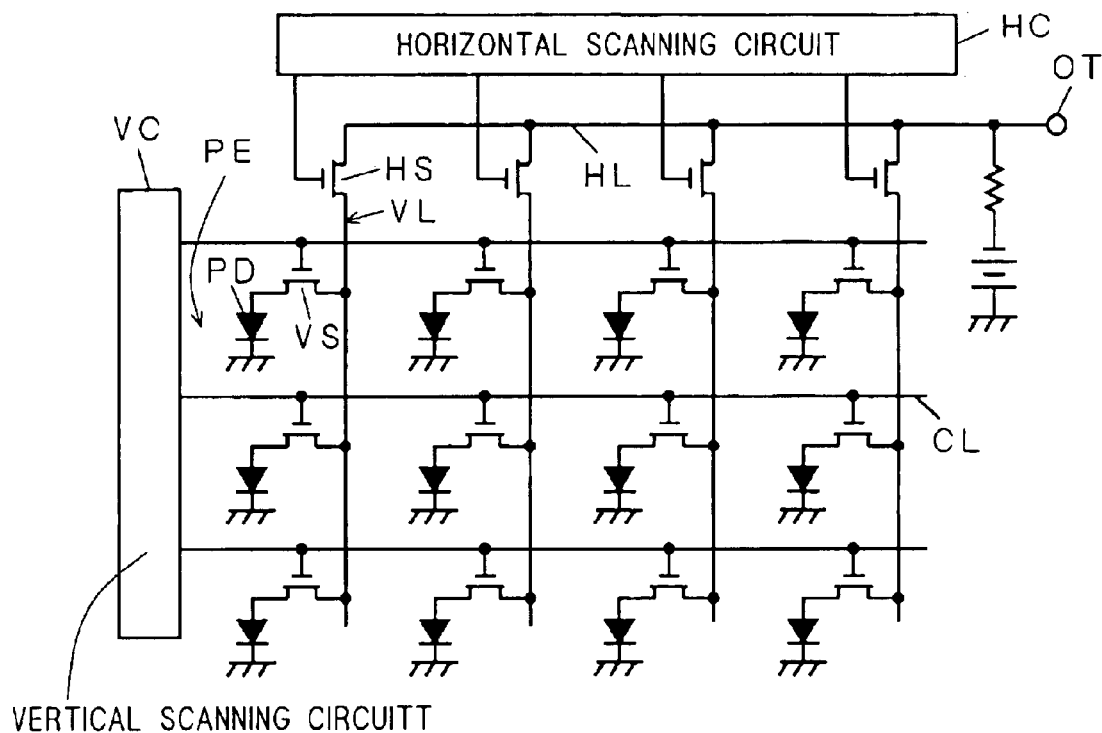
FIG. 22 is a conceptual diagram showing the structure of a MOS sensor.

Referring now to FIGS. 21 and 22, a basic construction of a digital camera according to the fifth preferred embodiment of the present invention will be described.

As shown in FIG. 21, a digital camera 200 comprises a solid-state image sensor 201, such as a MOS sensor or MOS imaging device, from which read pixels can be randomly selected. A read pixel selector 202 addresses pixels of the solid-state image sensor 201 to select pixels-to-be-read or read-pixels. An analog-to-digital (A/D) converter 203 converts an analog image signal received from the solid-state image sensor 201 into digital form. A signal processor 204 receives a digital image signal, which is the output of the A/D converter 203, to apply signal processing such as gamma correction and white-balance adjustment to the image signal. A buffer memory 205 is operable to once store processed image signals, i.e., image data or pixel data. A lens driver 206 drives a lens 207 in a direction of the optical axis to adjust the focus of the lens. A controller 210 controls the total operation of the camera. A display 221 such as a liquid crystal display (LCD) displays a subject image and photographic settings, and a display memory 222 is provided for once storing an image signal that is transferred from the controller 210 to the display unit 221. A recorder 223 is operable to record the image signal that has been compressed in the controller 210 for recording, into a recording medium such as a SmartMedia card, CompactFlash (CF) card, and PC memory card. A switch group 208 is provided for a user to input commands to the digital camera 200.

The switch group 208 includes: a main switch S0 which is a power switch of the digital camera 200; a switch S1 that is turned on when an exposure initiating switch or release switch is half-pressed; a switch S2 that is turned on when the release switch is full-pressed; and switches SAF1 and SAF2 for designating a portion of a photograph region to be used for AF operation.

The controller 210 has various functions as a total controller of the camera, but FIG. 21 shows only limited parts necessary for carrying out a control method according to the present invention. More specifically, there are shown a data selector 211 for reading out image signals or image data stored in the buffer memory 205 and skipping image signals for some pixel data in response to pixel-skipping commands. An AF operation unit 212 calculates a focusing position of the lens from the image signal obtained through data skipping in the data selector 211 or the image signal received from the buffer memory 205. An AF controller 213 controls the lens driver 206 on the basis of the operation result of the AF operation unit 212. An image data compressor 214 compresses the image signal obtained through data skipping in the data selector 211 or the image signal from the buffer memory 205 and outputting the compressed signal to the recorder 223. A pixel read pattern selector 215 (pattern selector) has a plurality of pixel read patterns, for selecting one of them by the switch group 208. A pixel readout controller 216 controls the pixel selector 202 according to the selected read pattern. The combination of the pixel selector 202, the pattern selector 215, and the readout controller 216 functions as a control circuit for controlling a data-readout operation while changing a pattern of read-pixels which are read out of the MOS sensor 201 depending on the operation to be performed. The detail will be described later.

FIG. 22 is a conceptual diagram showing a basic configuration of the MOS sensor 201. The MOS sensor 201 has a matrix structure with rows and columns of pixels PE each composed of a photodiode PD and a MOS switch VS. The MOS switch VS is connected at its control electrode to one of control lines CL that extend from a vertical scanning circuit VC, at its one main electrode to one of vertical signal lines VL, and at its other main electrode to the photodiode PD. Each of the vertical signal line VL is connected to one main electrode of one MOS switch HS. The other main electrode and control electrode of the MOS switch HS are connected to a horizontal signal line HL and a horizontal scanning circuit HC, respectively. The horizontal signal line HL is connected to an output terminal OT.

In such a MOS sensor 201, signal charge (i.e., pixel data) photoelectrically converted by each photodiode PD is read out on the corresponding vertical signal line VL when the MOS switch VS is brought into conduction under the control of the vertical scanning circuit VC. The signal charge on the vertical signal line VL is read on the horizontal signal line HL when the MOS switch HS is brought into conduction under the control of the horizontal scanning circuit HC, and outputted via the output terminal OT to the outside. That is, pixel data of any pixel can be read out by controlling the vertical scanning circuit VC and the horizontal scanning circuit HC.

The advantage in using the MOS image sensor is not only to be able to read out pixel data of any pixel but also to increase an opening area of each photodiode since the signal lines can be made thinner than transfer lines of the CCD and to reduce a driving voltage as compared to the CCD.

Image sensors capable of reading out pixel data of any pixel, other than the MOS image sensor, are for example a CMD (Charged Modulation Device) for storing charge converted photoelectrically by a MOS capacitor, and an SIT (Static Induced Transistor) image sensor composed principally of SITs.

E-2. Pixel Read Pattern

The pixel read pattern will now be described with FIGS. 23 through 26. The pixel read pattern is a pattern for designating pixels to be read, out of all pixels constituting the solid-state image sensor 201. Since the objective of using such a pattern is to reduce the number of pixel data to be read, the pattern may also be referred to as a "skipping pattern". FIGS. 23 through 26 show first through fourth read patterns, respectively.

Figure 23:
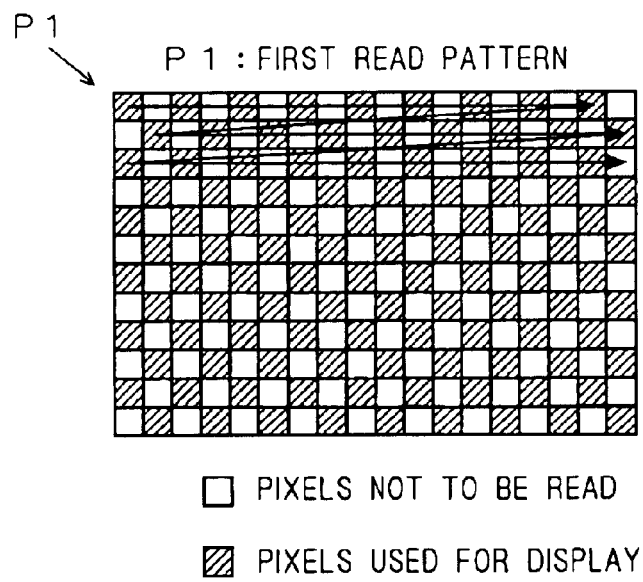
FIGS. 23 through 26 are conceptual diagrams each showing an example of a read pattern of pixel data.

The first read pattern P1 shown in FIG. 23 is a pattern for outputting pixel data of every alternate pixel along a read direction of data, which is direction of the arrow in the drawing, across the entire region of the solid-state image sensor 201. As shown in FIG. 23, pixels not to be read are indicated by open areas and pixels to be read are indicated by hatch areas, those pixels forming a checkered pattern.

According to the first read pattern P1, half of pixels are not to be read. The pattern P1 is thus suitable for displaying an image on the display 221 that has a smaller number of pixels than the solid-state image sensor 201. In this case, pixels to be read are equivalent to pixels used for display.

Figure 24:
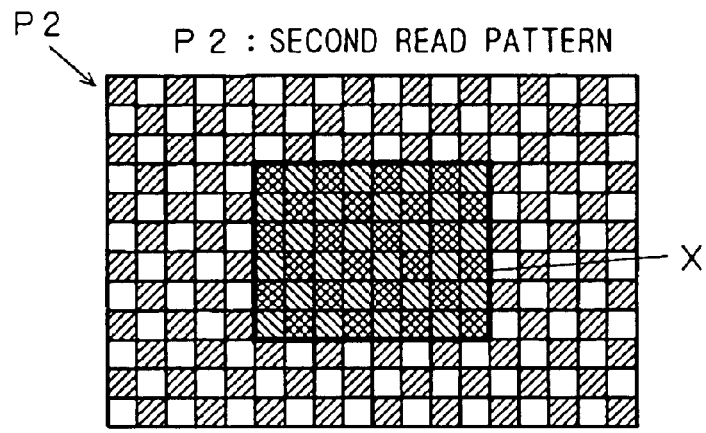

The second read pattern P2 shown in FIG. 24 is a pattern for outputting pixel data of every pixel in a central portion X of the solid-state image sensor 201, and in the other portion, outputting pixel data of every alternate pixel like the first read pattern P1.

In this case, the central portion X has a higher read-pixel density than the other portion of the photograph region and thus more pixel data are obtained from that portion. Here the term "read-pixel density" refers to the number of pixels to be read per unit area. Accordingly, the second read pattern P2 achieves high focusing accuracy when a subject image in the central part is brought into focus in the AF operation. For image display on the display 221, the same pixel data as used in the first read pattern P1 are used. Thus, the pixels in the central portion X can be classified into two types: pixels used for AF operation and pixels used for both display and AF operation. In FIG. 24, those two types of pixels are shown by different hatch patterns.

Figure 25:
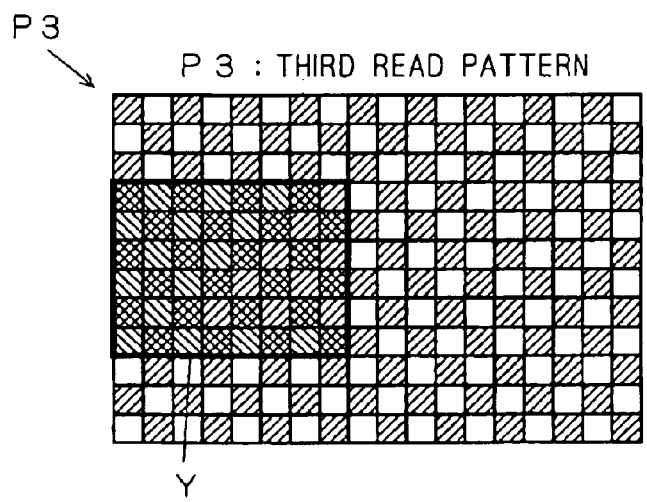

The third read pattern P3 shown in FIG. 25 is a pattern for outputting pixel data of every pixel in a left portion Y of the solid-state image sensor 201 on the drawing paper, and in the other portion, outputting pixel data of every alternate pixel image like the first read pattern P1.

Accordingly, the third read pattern P3 achieves high focusing accuracy when a subject image in the left side of the photograph region is brought into focus in the AF operation. For image display on the display 221, the same pixel data as used in the first read pattern P1 are used. Thus, the pixels in the left portion Y can be classified into two types: pixels used for AF operation and pixels used for both display and AF operation. In FIG. 25, those two types of pixels are shown by different hatch patterns.

Figure 26:
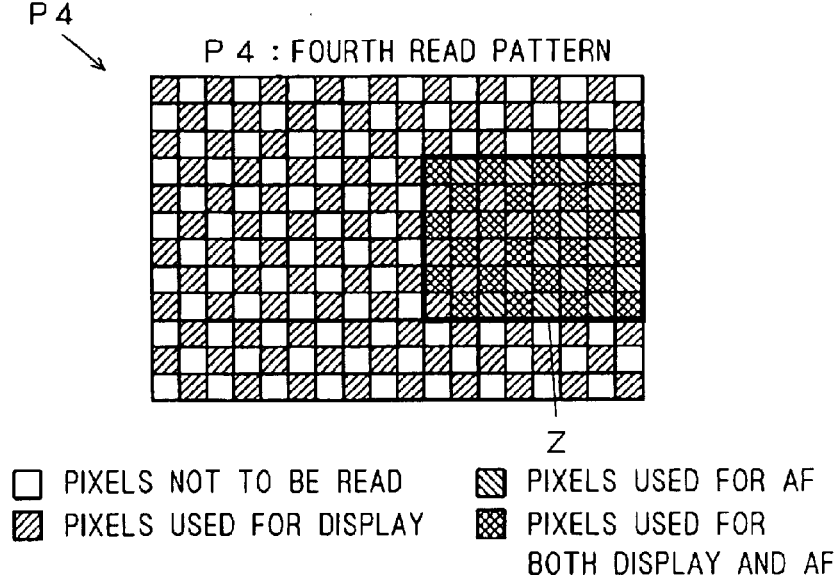

The fourth read pattern P4 shown in FIG. 26 is a pattern for outputting pixel data of every pixel in a right portion Z of the solid-state image sensor 201 on the drawing paper, and in the other portion, outputting pixel data of every alternate pixel like the first read pattern P1.

Accordingly, the fourth read pattern P4 achieves high focusing accuracy when a subject image in the right side of the photograph region is brought into focus in the AF operation. For image display on the display 221, the same pixel data as used in the first read pattern P1 are used. Thus, the pixels in the right portion Z can be classified into two types: pixels used for AF operation and pixels used for both display and AF operation. In FIG. 26, those two types of pixels are shown by different hatch patterns.

The pattern selector 215 is configured to select the second to fourth read patterns P2 to P4 by a combination of ON/OFF positions of the switches SAF1 and SAF2.

E-3. Operation of Digital Camera 200

Referring now to flow charts of FIGS. 27 and 28 in conjunction with FIG. 21, the control method of the digital camera according to the present invention will be described. Each of the symbols ① to ③ in FIG. 27 connects to the same in FIG. 28.

Figure 27:
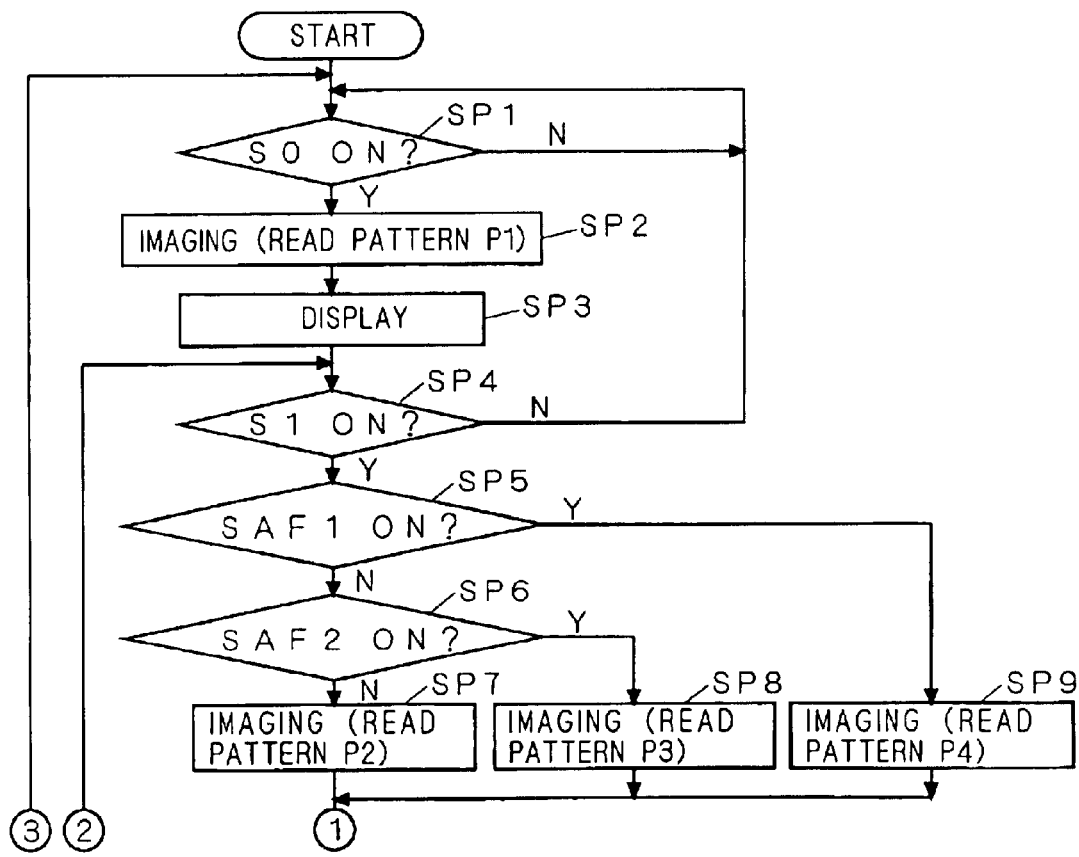
FIGS. 27 and 28 are flow charts illustrating a control method of the digital camera according to the fifth preferred embodiment of the present invention.
Figure 28:
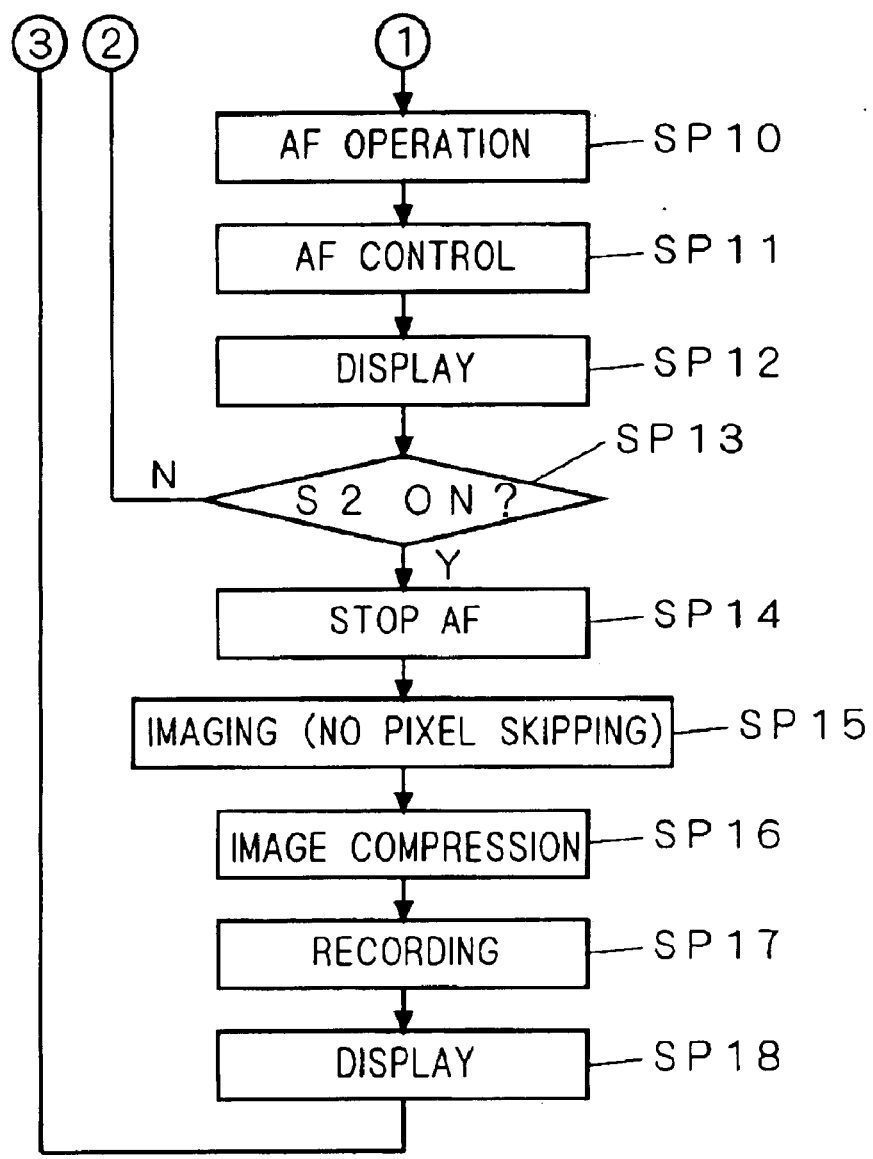

As shown in FIG. 27, if the main switch S0 is in the on state (step SP1), the solid-state image sensor 201 outputs analog image signals representing a subject image formed thereon through the lens 207, i.e., an image is formed. The pattern selector 215 is configured to select the first read pattern P1 described with FIG. 23 when only the main switch S0 is on. The controller 216 thus controls the pixel selector 202 according to the first read pattern P1, whereby the solid-state image sensor 201 outputs the analog image signals corresponding to the first read pattern P1 (step SP2).

The analog image signals are then converted into digital form by the A/D converter 203. The digital image signals are subjected to signal processing such as gamma correction and white-balance adjustment by the signal processor 204 and once stored in the buffer memory 205. Since the signals stored in the buffer memory 205 have already been processed suitable for display by going through data skipping and signal processing, signals selected by the data selector 211 are immediately transmitted to the display memory 222 and presented on the display 221 (step SP3). If the main switch S0 is on, on the other hand, the solid-state image sensor 201 repeats imaging and the display 221 continues presenting an image according to the first read pattern P1.

If a user half-presses the release switch and thereby the switch S1 is turned on, the AF operation starts (step SP4). If the switch S1 is off, the foregoing steps (SP1 to SP4) are repeated.

The AF operation of the digital camera 200 is such that the AF operation unit 212 performs arithmetic operation on the basis of the pixel data or image signal received from the solid-state image sensor 201, and according to the operation result, the AF controller 213 controls the lens driver 206 to automatically adjust the focus of the lens 207. For the arithmetic operation, the AF operation unit 212 employ a common method called a contrast or hill-climbing method.

The contrast method notes luminance difference between pixel data, i.e., contrast value, as an index of focusing. It is a method for repeatedly making a comparison between contrast values obtained by moving the lens 207, e.g., if a contrast value of pixel data obtained by moving the lens 207 a predetermined distance in one direction is small, comparing that value with a contrast value obtained by moving the lens 207 a predetermined distance in the opposite direction, and determining a position of the lens where the maximum contrast value is obtained as a focusing position. Alternatively, the index of focusing may be a high-frequency component of pixel data.

As previously described, the AF operation is based on the pixel data obtained according to either of the second to fourth read patterns P2 to P4 which is selected by the combination of ON/OFF positions of the switches SAF1 and SAF2. The ON/OFF positions of the switches SAF1 and SAF2 are checked in steps SP5 and SP6, respectively.

As shown in FIG. 27, the pattern selector 215 selects the fourth read pattern P4 when the switch SAF1 is in the on state (step SP9), or the third read pattern P3 when the switch SAF1 is in the off state and the switch SAF2 is in the on state (step SP8), or the second read pattern P2 when both the switches SAF1 and SAF2 are in the off state (SP7).

According to the selected read pattern (either of the second to fourth read patterns P2 to P4), the readout controller 216 controls the pixel selector 202 and the solid-state image sensor 201 outputs analog image signals.

The analog image signals are converted into digital form by the A/D converter 203. After being subjected to the signal processing such as gamma correction and white-balance adjustment by the signal processor 204, the digital image signals are once stored in the buffer memory 205. Then, signals selected by the data selector 211 are transmitted to the AF operation unit 212, wherein the AF operation is performed in step SP10 of FIG. 28 on the basis of pixel data obtained from either of the portions X to Z corresponding to the second to fourth read patterns P2 to P4, respectively.

According to the result of the, AF operation, the AF controller 213 controls the lens driver 206 to move the lens 207 (step SP11). Of the digital image signals (corresponding to either of the second to fourth read patterns P2 to P4) selected by the data selector 211, signals used for both display and AF operation and signals used for display, i.e., signals corresponding to the first read pattern P1, are also transmitted to the display memory 222 and presented on the display 221 (step SP12).

In the aforementioned contrast method employed in the AF operation, the lens 207 is repeatedly moved to determine the position where the maximum contrast value is obtained. Thus, SP10 and later steps will be repeated at least a plurality of times. In the case of FIGS. 27 and 28, as seen from step SP13, the AF operation between steps SP4 and SP12 are repeated until a user full-presses the release switch and thereby the switch S2 is turned on. When the focusing position is determined by the AF operation, it appears for example on the display 221, and at the sight of the display, the user full-presses the release switch.

If the switch S2 is on in step SP13, the AF operation is stopped (step SP14) and the pixel selector 202 is controlled to obtain analog image signals from all pixels of the solid-state image sensor 201 (step SP15).

The analog image signals of all the pixels are converted into digital form by the A/D converter 203. After being subjected to the signal processing such as gamma correction and white-balance adjustment by the signal processor 204, the digital image signals are once stored in the buffer memory 205, read out by the data selector 211, compressed for example in the JPEG format by the image data compressor 214 (step SP16), and recorded in the recorder 223 (step SP17). Of the digital image signals selected by the data selector 211 (corresponding to data of all the pixels), signals corresponding to the first read pattern P1 are also transmitted to the display memory 222 and presented on the display 221 (step SP18).

In the imaging of the foregoing steps SP2 and SP7 to SP9, when changing the read pattern, stored charge of each pixel should be reset according to the new read pattern. This allows the exposure time of read pixels according to the new read pattern to remain unchanged.

E-2. Feature and Effect

In the aforementioned digital camera and the control method thereof according to the fifth preferred embodiment, a solid-state image sensor capable of randomly selecting read pixels is used. Accordingly, although all pixel data are read out in the actual imaging for recording, the number of pixel data to be read in the imaging for presenting a subject image on the display or in the preliminary imaging for automatic focusing prior to the actual imaging, is reduced in a stage where the solid-state image sensor outputs the data. This reduces time required for the processing of read pixel data and time involved in the preliminary imaging, thereby reducing time required before the actual imaging.

F. Modifications

In the first through fourth preferred embodiments, if the present invention is applied to a portable digital camera as described, at least the latest image needs to be stored in a memory such a buffer memory. However for a fixed digital camera that is normally connected via a cable to a computer, image signals may be transferred and stored in the connected computer without forming a memory in the camera.

In the third and fourth preferred embodiments, the buffer memory 82B has a storage capacity of a plurality of images. Alternatively, the display memory 84 may have a storage capacity of a plurality of images.

In the first through fourth preferred embodiments, the read circuit of the solid-state image sensor 9 may perform a nondestructive readout according to a MOS-driven floating gate method or by the use of a bipolar transistor.

In the first through fourth preferred embodiments, the read circuit of the solid-state image sensor 9 has a source-follower structure. Alternatively it may have an amplifier-type structure capable of reading out data nondestructively, such as an inverter structure.

In the first through fourth preferred embodiments, each photocell may store positive holes as charge instead of photoelectrons.

In the photography of the third and fourth preferred embodiments, write protection may automatically be given to the buffer memory when the image controller 83 monitoring images detects that charges accumulated in a predetermined number of photocells 93 in the solid-state image sensor 9 reach a level of saturation. Accordingly, the memory can store only effective image data without recording unnecessary image data.

In the fourth preferred embodiment, the image-capture operation is terminated at the second push of the release button, but after the second push, a predetermined number of images may be captured. The number is preferably about M/2. By so doing, images before and after the push of the release button are obtained. This prevents the image-capture operation from ending in failure even if a user pushes the button earlier by mistake.

In the fifth preferred embodiment, the pattern for outputting pixel data of every alternate pixel along the read direction of data is cited as a read pattern suitable for image display, assuming that the number of pixels of the display is about a half that of the solid-state image sensor. If the number of pixels of the display is one third or fourth that of the solid-state image sensor, the read pattern should be set accordingly.

The pattern for reducing pixel data of the solid-state image sensor to a half may be a pattern for performing data skipping in columns of pixels.

In the fifth preferred embodiment, pixel data skipping is performed for the AF operation. The data skipping method can be utilized for autoexposure (AE) or white-balance adjustment.

Further, although the second to fourth read patterns P2 to P4 are used as the read pattern for the AF operation, the present invention is not limited thereto. For example, the pixel density in the X to Z portions for AF operation may be set according to focusing accuracy.

In the fifth preferred embodiment, the pattern selector 215 and the pixel readout controller 216 are configured as hardware, but the function of the controller 210 including those units may be achieved by computer. In such cases, the procedure of FIGS. 27 and 28 is operated by a program.

While the invention has been described in detail, the foregoing description is in all aspects illustrative and not restrictive. It is understood that numerous other modifications and variations can be devised without departing from the scope of the invention.

What is claimed is:

1. A digital camera comprising:
   an image sensor for converting a subject image into an electric signal on a plurality of pixels to obtain a captured image, said image sensor being capable of randomly selecting one or more pixels to be read-out from said plurality of pixels;
   a control circuit for reading-out said electric signal from said image sensor in accordance with a pixel pattern, said pixel pattern being different among first and second operations of said digital camera; and wherein:
   said first operation is a recording operation to record said captured image in a recording medium in accordance with a first pixel pattern;
   said second operation is an autofocusing operation to obtain focus in accordance with a second pixel pattern in said captured image; and
   said second pixel pattern has a predetermined area having a higher density of pixels-to-be-read than the other areas of said second pixel pattern.

2. The digital camera according to claim 1, wherein said predetermined area of said second pixel pattern is variable according to a position of said subject image in focus.

3. A method of controlling a digital camera comprising an image sensor capable of randomly selecting pixels-to-be-read, comprising the steps of:
   (a) designating one operation out of a plurality of operations to thereby determine a designated operation;
   (b) selecting one of a plurality of pixel patterns in accordance with said designated operation to determine a selected pixel pattern, and reading-out pixel signals from said image sensor in accordance with said selected pixel pattern;
   (c) executing said designated operation using pixel signals which are read-out from said image sensor in accordance with said selected pixel pattern, wherein said designated operation is an autofocusing operation to obtain focus on the basis of an image captured by said image sensor; and said step (b) includes the step of:
selecting a pixel pattern adapted to calculation of a focusing position, wherein said pixel pattern has a predetermined area having a higher density of pixels-to-be-read than the other areas.

4. The method according to claim 3, wherein said predetermined area corresponds to a position of a subject image in focus.

5. A digital camera comprising:
   an image sensor for converting a subject image into an electric signal, said image sensor being capable of randomly selecting pixels-to-be-read;
   a pattern selector for selecting a first pixel pattern in accordance with a recording operation to record a captured image in a recording medium, said pattern selector further selecting a second pixel pattern having a smaller number of pixels-to-be-read than said first pixel pattern in accordance with an autofocusing operation on the basis of said captured image, said pattern selector further selecting a third pixel pattern having a smaller number of pixels-to-be-read than said second pixel pattern in accordance with a display operation to display said captured image; and
   a control circuit for selecting pixels-to-be read from all pixels of said image sensor in accordance with the selected pixel pattern, to read out the selected pixels.

6. A method of controlling a digital camera comprising an image sensor capable of randomly selecting pixels-to-be-read, comprising the steps of:
   converting a subject image into an electric signal;
   selecting a first pixel pattern in accordance with a recording operation to record a captured image in a recording medium;
   selecting a second pixel pattern having a smaller number of pixels-to-be-read than said first pixel pattern in accordance with an autofocusing operation on the basis of said captured image;
   selecting a third pixel pattern having a smaller number of pixels-to-be read than said second pixel pattern in accordance with a display operation to display said captured image; and
   selecting pixels-to-be-read from all pixels of said image sensor in accordance with the selected pixel pattern, to read out the selected pixels.

* * * * *